(12) United States Patent
Mitsubori et al.

(10) Patent No.: US 9,587,735 B2
(45) Date of Patent: Mar. 7, 2017

(54) POWER UNIT FOR A VEHICLE, AND VEHICLE INCLUDING SAME

(71) Applicant: HONDA MOTOR CO., LTD., Minato-ku, Tokyo (JP)

(72) Inventors: Toshimasa Mitsubori, Wako (JP); Eiji Kittaka, Wako (JP); Dai Arai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/861,038

(22) Filed: Sep. 22, 2015

(65) Prior Publication Data

US 2016/0082834 A1    Mar. 24, 2016

(30) Foreign Application Priority Data

Sep. 24, 2014 (JP) .................. 2014-193835

(51) Int. Cl.
| | | |
|---|---|---|
| *F16H 61/00* | (2006.01) | |
| *F16H 61/70* | (2006.01) | |
| *F16H 3/20* | (2006.01) | |
| *B60K 17/08* | (2006.01) | |

(52) U.S. Cl.
CPC ......... *F16H 61/0021* (2013.01); *B60K 17/08* (2013.01); *F16H 3/20* (2013.01); *F16H 61/705* (2013.01)

(58) Field of Classification Search
CPC ...... F16H 61/0021; F16H 61/705; F16H 3/20; F16H 59/72; F16H 2059/725; F16H 57/0447; F16H 57/0449; B60K 17/08; F16D 48/02; F16D 48/0206; F16D 25/14; F16D 2500/30404; F16D 2500/7043
See application file for complete search history.

(56) References Cited

U.S. PATENT DOCUMENTS

| | | | | |
|---|---|---|---|---|
| 5,056,614 A | * | 10/1991 | Tokushima | ........ B60K 23/0808 180/248 |
| 5,957,807 A | * | 9/1999 | Takamatsu | ............ F16H 61/061 477/156 |
| 8,229,637 B2 | * | 7/2012 | Kobayashi | .............. F16H 59/72 701/51 |

(Continued)

FOREIGN PATENT DOCUMENTS

JP    2010-223395 A    10/2010

*Primary Examiner* — Laura Freedman
(74) *Attorney, Agent, or Firm* — Carrier Blackman & Associates, P.C.; Joseph P. Carrier; Anne G. Sabourin

(57) ABSTRACT

A power unit includes a transmission adapted to transmit rotational power from a crankshaft to a drive axle, with speed change. The transmission has an input shaft rotatably supported on a crankcase. A hydraulic clutch, configured to be selectively engaged and disengaged, is disposed coaxially with the input shaft. A clutch cover covering the hydraulic clutch is connected to the crankcase. A clutch actuator, which controls switching between engagement and disengagement of the hydraulic clutch, and an actuator cover, which covers the clutch actuator in a liquid-tight manner, are mounted to an outer surface of the clutch cover. An oil temperature sensor is mounted to the actuator cover, and is provided for detecting a temperature of oil in an oil chamber, formed between the clutch cover and the actuator cover.

20 Claims, 16 Drawing Sheets

(56) References Cited

U.S. PATENT DOCUMENTS

| | | | | |
|---|---|---|---|---|
| 8,505,669 B2* | 8/2013 | Ueda | ...................... | B60K 23/04 |
| | | | | 180/233 |
| 8,689,548 B2* | 4/2014 | Maehara | ............. | F16D 48/0206 |
| | | | | 60/328 |
| 9,157,524 B2* | 10/2015 | Nozaki | ............... | F16H 61/0213 |
| 9,193,258 B2* | 11/2015 | Hoshinoya | ............. | B60K 11/02 |
| 9,316,270 B2* | 4/2016 | Mitsubori | ............... | F16D 25/06 |
| 2014/0097043 A1* | 4/2014 | Hoshinoya | .......... | F16H 57/0405 |
| | | | | 184/6.4 |
| 2014/0290407 A1* | 10/2014 | Tsuchihashi | ............ | F16D 48/02 |
| | | | | 74/405 |
| 2016/0082833 A1* | 3/2016 | Mitsubori | ............. | B60K 17/08 |
| | | | | 180/383 |

* cited by examiner

POWER UNIT FOR A VEHICLE, AND VEHICLE INCLUDING SAME

CROSS-REFERENCE TO RELATED APPLICATIONS

The present invention claims priority under 35 USC 119 based on Japanese patent application No. 2014-193835, filed on Sep. 24, 2014. The entire subject matter of this priority document, including specification claims and drawings, is incorporated by reference herein.

BACKGROUND OF THE INVENTION

Technical Field of the Invention

The present invention relates to a power unit in which a transmission adapted to transmit rotational power from a crankshaft, rotatably supported by a crankcase, to a drive axle of a vehicle. The power unit is accommodated in, and has an input shaft rotatably supported on the crankcase. A hydraulic clutch, configured to be selectively engaged and disengaged to effect and interrupt transmission of power between the crankshaft and the input shaft, is disposed coaxially with the input shaft.

Background Art

A power unit wherein an oil temperature sensor for control of the oil pressure in a hydraulic clutch is mounted to an oil supply passage extending from an oil pump to a clutch actuator has already been known, as disclosed in Patent Document 1.

[Patent Document 1] Japanese Patent Laid-Open No. 2010-223395

In a power unit wherein switching between the engagement and disengagement of a hydraulic clutch is controlled by an operation of a clutch actuator, the oil temperature has a great influence on the control properties.

In a configuration wherein an oil temperature sensor is attached to an oil supply passage extending from an oil pump to a clutch actuator, such as the one disclosed in Patent Document 1, the oil temperature at the hydraulic clutch is predicted on the basis of the temperature of the oil flowing through the oil supply passage.

In order to enhance the accuracy of control of the hydraulic clutch through appropriately coping with variations in oil temperature, therefore, it is desirable to detect the oil temperature at a part of the power unit as close to the hydraulic clutch as possible.

SUMMARY OF THE INVENTION

The present invention has been made in consideration of the above-mentioned circumstances. Accordingly, it is an object of the present invention to provide a power unit which makes it possible to accurately control a hydraulic clutch through appropriately coping with temperature variations.

Means for Solving the Problem

In order to achieve the above object, according to the present invention, there is provided a power unit including a transmission adapted to transmit rotational power from a crankshaft rotatably supported by a crankcase, with speed change. The transmission has an input shaft rotatably supported on the crankcase. The transmission is accommodated in the crankcase. The power unit further includes a hydraulic clutch engaged and disengaged to effect and interrupt transmission of power between the crankshaft and the input shaft. The hydraulic clutch is disposed coaxially with the input shaft. In the power unit, a clutch cover covering the hydraulic clutch is connected to the crankcase. A clutch actuator which is adapted to control switching of engaging and disengaging operations of the hydraulic clutch and an actuator cover which covers the clutch actuator in a liquid-tight manner between the clutch cover and itself are mounted to an outer surface of the clutch cover. An oil temperature sensor adapted to detect the temperature of oil accumulated in an oil chamber formed between the clutch cover and the actuator cover is mounted to the actuator cover.

The power unit is characterized secondly, in addition to the first characteristic, in that a hydraulic clutch relief oil passage through which the oil from the hydraulic clutch is discharged into the oil chamber is provided in an actuator body which constitutes part of the clutch actuator and is mounted to the clutch cover.

The power unit is characterized thirdly, in addition to the second characteristic, in that a clutch actuator relief oil passage through which the oil discharged from the clutch actuator is discharged into the oil chamber is provided in the actuator body.

The power unit is characterized fourthly, in addition to the second or third characteristic, in that an exit of the hydraulic clutch relief oil passage is provided at a lower portion of the actuator body. The oil temperature sensor is mounted to the actuator cover, with its detecting portion disposed in a vicinity of the exit of the hydraulic clutch relief oil passage.

The power unit is characterized fifthly, in addition to any one of the first to fourth characteristics, in that an oil return passage through which the oil in the oil chamber is returned to the crankcase side is provided in an upper portion of the clutch cover so as to be disposed above the clutch actuator.

Note that the first main shaft 69 and the second main shaft 70 in the embodiment described later correspond to the input shaft in the power unit of the present invention, the first hydraulic clutch 63 and the second hydraulic clutch 64 in the embodiment correspond to the hydraulic clutch in the power unit according to the present invention, and the second actuator body 200 in the embodiment corresponds to the actuator body in the power unit according to the present invention.

Effects of the Invention

According to the aforementioned first characteristic of the power unit of the present invention, the clutch actuator and the actuator cover which covers the actuator body in a liquid-tight manner between the clutch cover and itself are mounted to an outer surface of the clutch cover. In addition, the temperature of the oil accumulated in the oil chamber formed between the clutch cover and the actuator cover is detected by the oil temperature sensor mounted to the actuator cover. With the clutch actuator and the oil temperature sensor closely disposed in the vicinity of the hydraulic clutch, therefore, it is possible to detect an oil temperature closer to the oil temperature inside the hydraulic clutch. Consequently, the accuracy of control of the hydraulic clutch can be enhanced.

According to the aforementioned second characteristic of the power unit according to the present invention, the oil discharged from the hydraulic clutch flows into the oil chamber between the clutch cover and the actuator cover, and the oil temperature inside the oil chamber is detected by the oil temperature sensor. Therefore, it is possible to detect an oil temperature closer to the oil temperature inside the hydraulic clutch, and thereby to enhance more the accuracy of control of the hydraulic clutch.

According to the aforementioned third characteristic of the power unit according to the present invention, the oil discharged from the clutch actuator flows into the oil chamber. Therefore, the oil on the side of being supplied to the hydraulic clutch and the oil on the side of being discharged from the hydraulic clutch are mixed with each other in the oil chamber, and the temperature of the thus mixed oil is detected by the oil temperature sensor. As a result, it is possible to accurately detect the temperature of the oil inside the hydraulic clutch, and thereby to further enhance the accuracy of control of the hydraulic clutch.

According to the aforementioned fourth characteristic of the power unit according to the present invention, the exit of the hydraulic clutch relief oil passage for guiding the oil discharged from the hydraulic clutch is provided at a lower portion of the actuator body, and the detecting portion of the oil temperature sensor is disposed in the vicinity of the exit. Therefore, the temperature of the oil discharged from the hydraulic clutch immediately after starting can be swiftly detected by the oil temperature sensor, whereby the controllability of the hydraulic clutch at the time of warm-up can be enhanced.

According to the aforementioned fifth characteristic of the power unit according to the present invention, the oil return passage through which the oil in the oil chamber is returned to the crankcase side is provided at an upper portion of the clutch cover so as to be located above the clutch actuator. Therefore, the clutch actuator is located below the oil surface inside the oil chamber, and can therefore be lagged with the surrounding oil. Consequently, it is possible to reduce variations in the temperature of the clutch actuator, and thereby to enhance the hydraulic clutch control performance.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of an off-road four-wheel-drive vehicle, seated on the driver's seat and facing forward. It should be understood that these terms are used for purposes of illustration, and are not intended to limit the invention.

Figure 1:
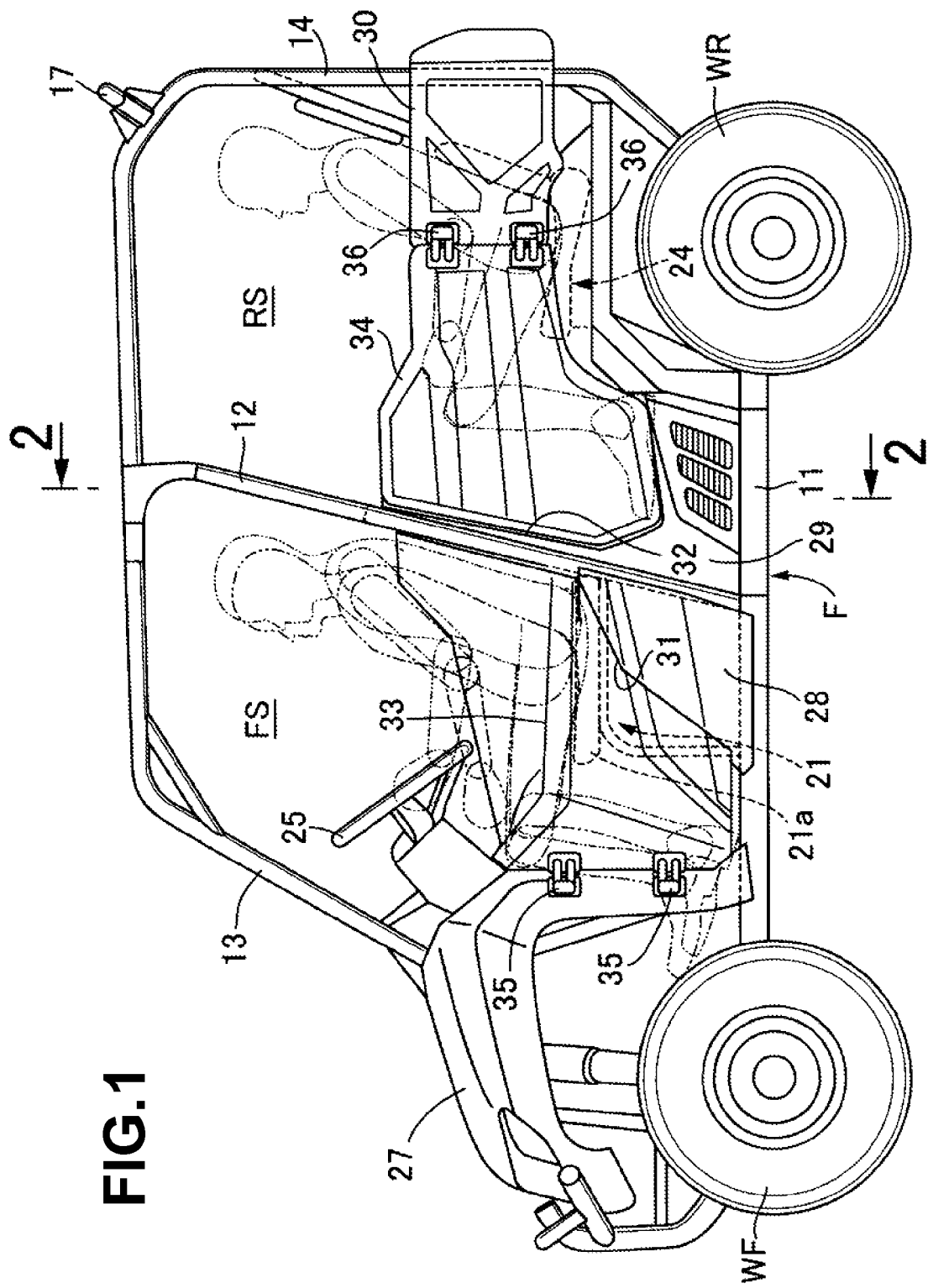
FIG. 1 is a side view of an off-road four-wheel-drive vehicle.
Figure 2:
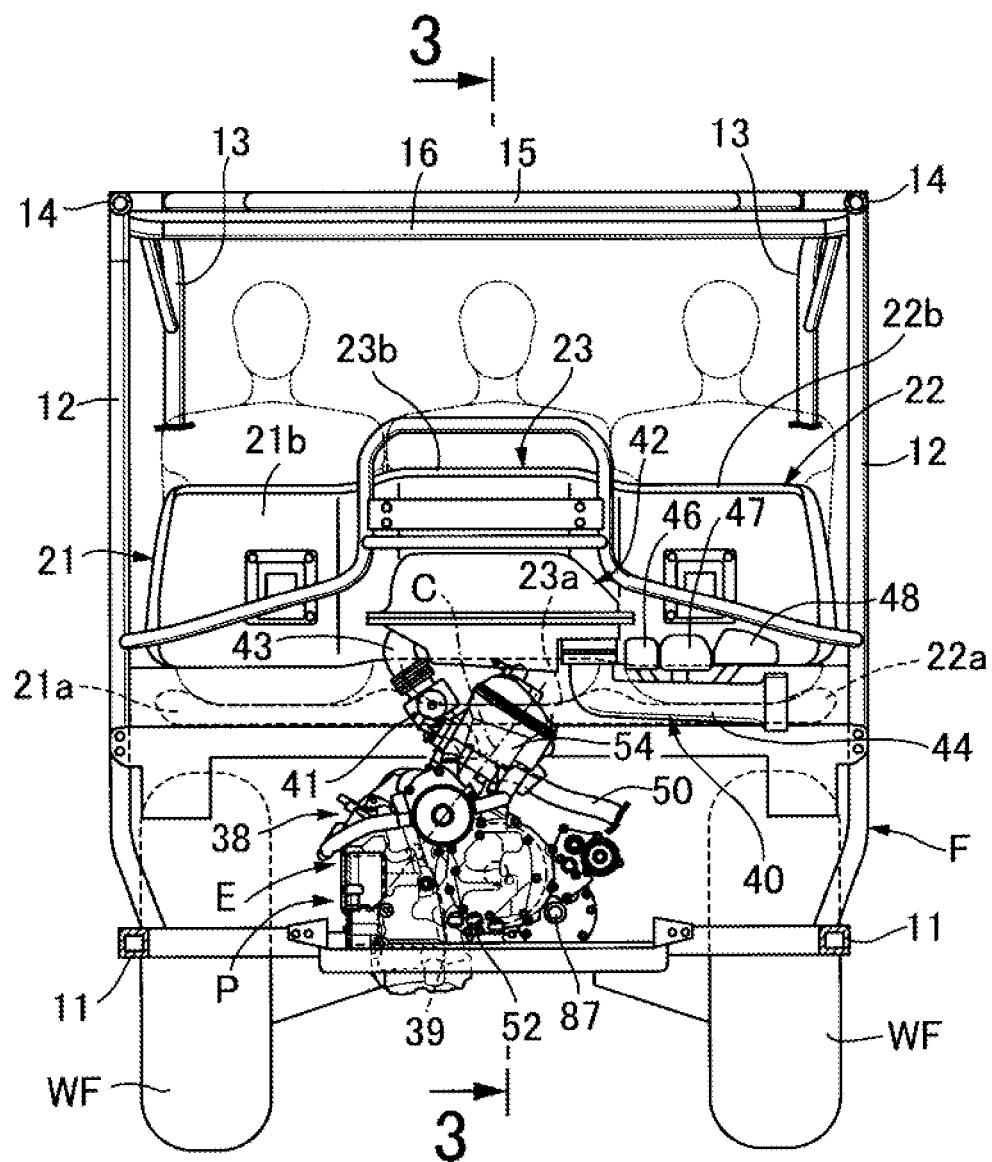
FIG. 2 is a sectional view taken along line 2-2 of FIG. 1.
Figure 3:
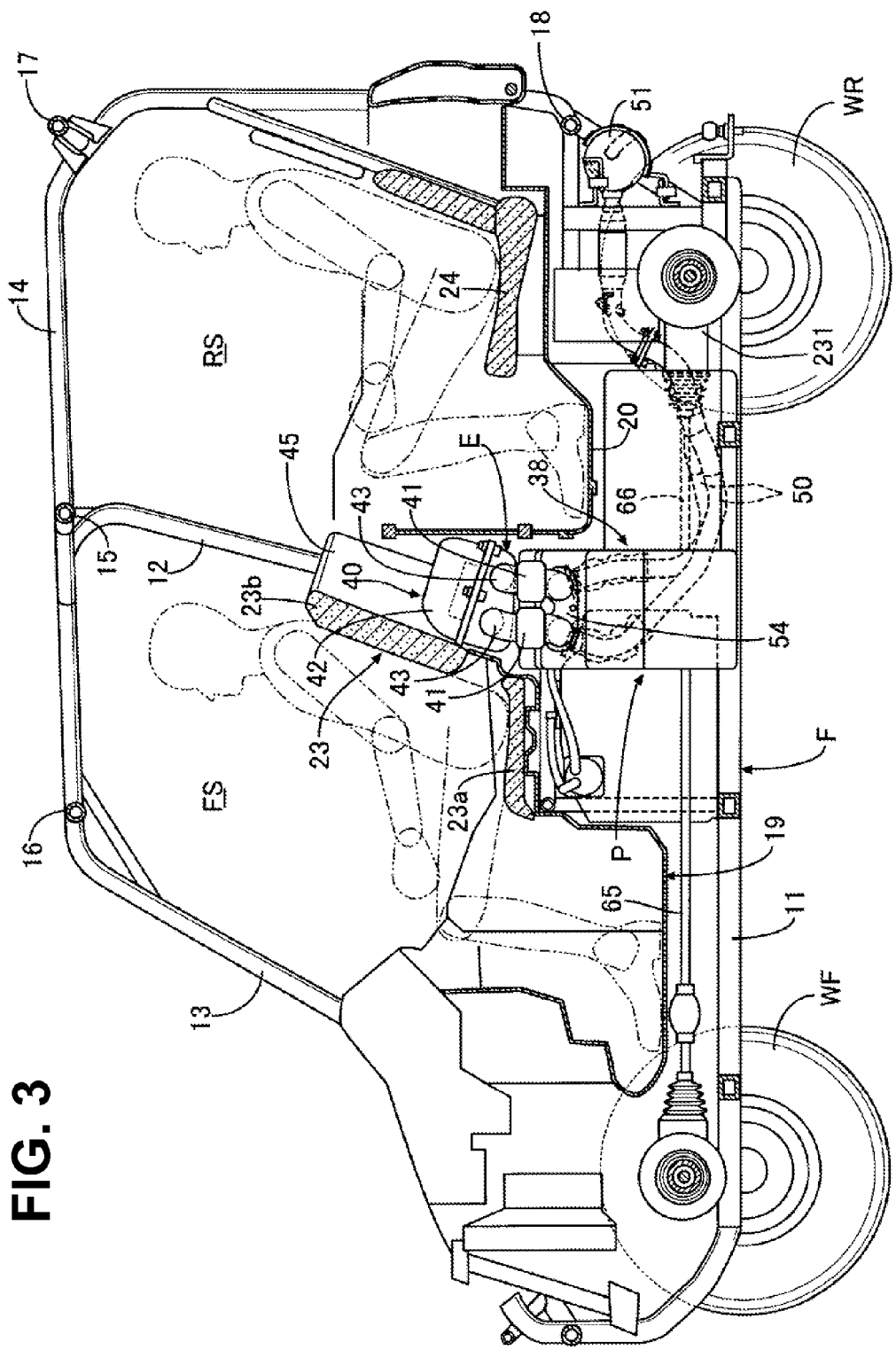
FIG. 3 is a sectional view taken along line 3-3 of FIG. 2.

First, in FIGS. 1 to 3, a pair of left and right front wheels WF are suspended from a front portion of a body frame F of the off-road four-wheel-drive vehicle as a four-wheeled vehicle, and a pair of left and right rear wheels WR are suspended from a rear portion of the body frame F.

The body frame F includes: a pair of left and right lower frames 11 extending in the longitudinal vehicle direction; a pair of left and right center riser frames 12 rising upward from intermediate parts in the longitudinal vehicle direction of the lower frames 11; a pair of left and right front side frames 13 extending forward from upper ends of the center riser frames 12, then extending forwardly downward and connected to front portions of the lower frames 11; a pair of left and right rear side frames 14 extending rearward from the upper ends of the center riser frames 12, then extending downward and connected to rear portions of the lower frames 11; a center cross member 15 interconnecting upper end portions of the pair of left and right center riser frames 12; a front cross member 16 interconnecting intermediate bent portions of the pair of left and right front side frames 13; an upper rear cross member 17 interconnecting intermediate bent portions of the pair of left and right rear side frames 14; and a lower rear cross member 18 interconnecting lower portions of the pair of left and right rear side frames 14.

The pair of left and right center riser frames 12 and the pair of left and right front side frames 13 constitute an outer frame block of a front riding space FS for a driver and a front passenger. A front floor 19 disposed forwardly of the center riser frames 12 so as to allow the driver and the front passenger to ride thereon is supported by a front portion of the body frame F. In addition, the pair of left and right center riser frames 12 and the pair of left and right rear side frames 14 constitute an outer frame block of a rear riding space RS for rear passengers. A rear floor 20 disposed rearwardly of the center riser frames 12 so as to permit the rear passengers to ride thereon is supported by a rear portion of the body frame F.

In the front riding space FS for the driver and the front passenger, a driver's seat 21 disposed rearwardly of a steering wheel 25 for steering the pair of left and right front wheels WF and a first front passenger's seat 22 disposed on one side in the left-right direction (in this embodiment, on the right side) of the driver's seat 21 are arranged separately from each other in the vehicle width direction.

The driver's seat 21 and the first front passenger's seat 22 include seat portions 21a and 22a and backrest portions 21b and 22b rising upward from rear portions of the seat portions 21a and 22a, respectively. Besides, a second front passenger's seat 23 is provided between the driver's seat 21 and the first front passenger's seat 22. The second front passenger's seat 23 includes a backrest portion 23b which is displaced forward as compared with the backrest portions 21b and 22b of the driver's seat 21 and the first front passenger's seat 22, and a seat portion 23a which is disposed between the seat portions 21a and 22a of the driver's seat 21 and the first front passenger's seat 22. On the other hand, in the rear riding space RS for the rear passengers, a pair of left and right rear passenger's seats 24 are provided.

Meanwhile, a front portion of the body frame F is covered with a front cover 27. In addition, front side covers 28 covering a rear-side lower portion of the front riding space FS from lateral sides, a pair of left and right center side covers 29 covering a front-side lower portion of the rear riding space RS from lateral sides, and a pair of left and right rear side covers 30 covering a rear-side lower portion of the rear riding space RS from lateral sides, are attached to the body frame F. Besides, on left and right rear portions of the front cover 27, a pair of left and right front doors 33 for opening and closing front entrances 31 defined between the front side covers 28 and the front cover 27 are turnably supported by pairs of upper and lower hinge portions 35, respectively. Further, on front portions of the rear side covers 30, a pair of left and right rear doors 34 for opening and closing rear entrances 32 defined between the center side covers 29 and the rear side covers 30 are turnably supported by pairs of upper and lower hinge portions 36, respectively.

A two-cylinder internal combustion engine E for producing motive power for rotationally driving the pair of left and right front wheels WF and the pair of left and right rear wheels WR is mounted on the body frame F, in the state of being disposed substantially in the center in the longitudinal vehicle direction in plan view. An engine main body 38 of the internal combustion engine E is vertically mounted on the body frame F, with the axis of a crankshaft 39 disposed along the longitudinal vehicle direction and with a cylinder axis C tilted toward the first front passenger's seat 22 side in the vehicle width direction. The engine main body 38 is disposed under the driver's seat 21 and the first front passenger's seat 22 in the center in the vehicle width direction.

Paying attention to FIGS. 2 and 3, an intake system 40 of the internal combustion engine E includes: throttle bodies 41 connected to a cylinder head 54 of the engine main body 38 on a cylinder basis; an air cleaner 42 disposed between the driver's seat 21 and the first front passenger's seat 22 in plan view; a pair of connecting tubes 43 each interconnecting a throttle body 41 and the air cleaner 42; and a single intake duct 44 for guiding air into the air cleaner 42.

Meanwhile, the backrest portion 23b of the second front passenger's seat 23 provided between the driver's seat 21 and the first front passenger's seat 22 is in integral connection with the backrest portions 21b and 22b of the driver's seat 21 and the first front passenger's seat 22, and is displaced forward as compared with the backrest portions 21b and 22b. As a result, the backrest portions 21b, 22b and 23b of the driver's seat 21, the first front passenger's seat 22 and the second front passenger's seat 23 form a recess 45 which is recessed to the front side in plan view. The air cleaner 42 is disposed in the recess 45.

A downstream end of the intake duct 44 extending to a right side portion of the vehicle body on the rear side of the seat portion 22a of the first front passenger's seat 22 is connected to a right side portion of the air cleaner 42. Resonators 46, 47 and 48 are connected respectively to a plurality of parts of the intake duct 44.

A pair of exhaust pipes 50 connected to lower side walls of the cylinder head 54 of the engine main body 38 are connected to an exhaust muffler 51, which is so disposed as to extend in the vehicle width direction along a rear edge of the body frame F and is supported by the body frame F.

Figure 4:
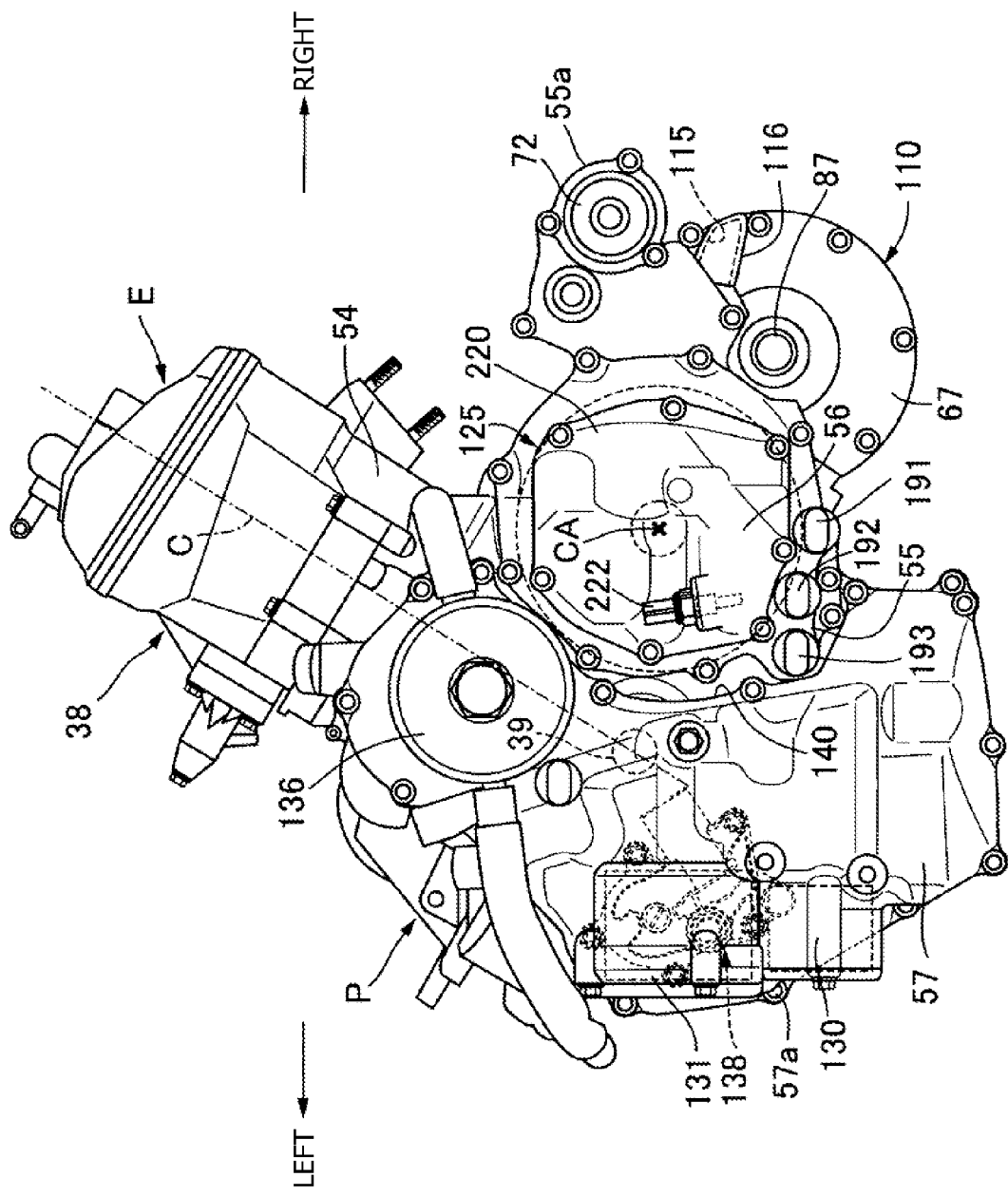
FIG. 4 is a back elevation of a power unit as viewed from the rear side of the vehicle.
Figure 5:
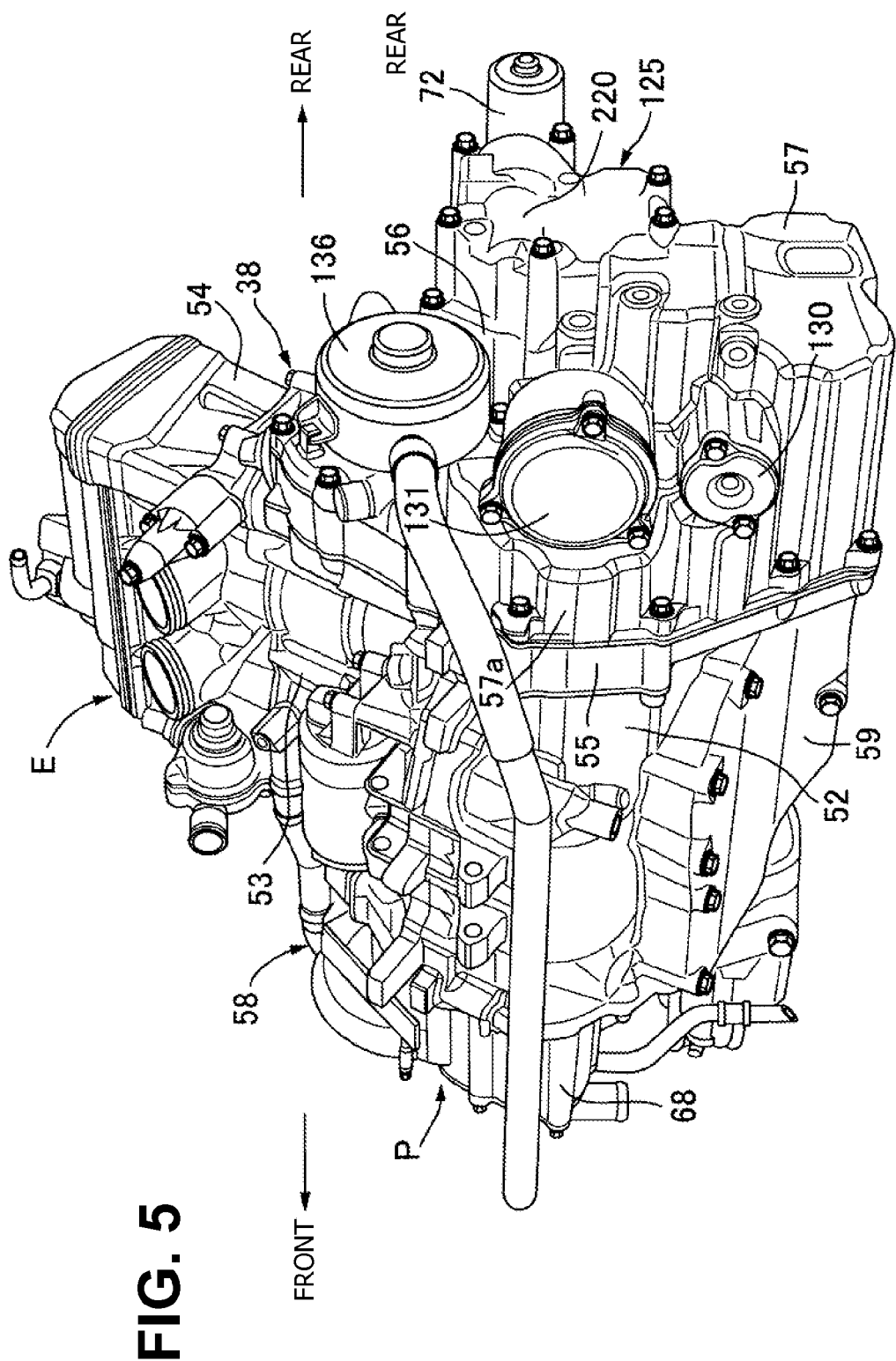
FIG. 5 is a perspective view of the power unit as viewed obliquely from a left rear side.

Referring to FIGS. 4 and 5 as well, the engine main body 38 includes: a crankcase 52 on which the crankshaft 39 extending in the longitudinal vehicle direction is rotatably supported; a cylinder block 53 connected to the crankcase 52, with the cylinder axis C inclined; and the cylinder head 54 connected to an upper portion of the cylinder block 53.

Besides, a spacer plate 55 constituting a part of the engine main body 38 is connected to a back surface of the crankcase 52. A clutch cover 56 and an oil storage tank 57 are connected to the crankcase 52 through the spacer plate 55, in such a manner as to project rearward from the crankcase 52. In addition, a subtransmission case 58 is connected to the opposite side of the axis of the crankshaft 39 from the oil storage tank 57, namely, to the front surface side of the crankcase 52. An oil pan 59 is connected to a lower portion of the crankcase 52.

Figure 6:
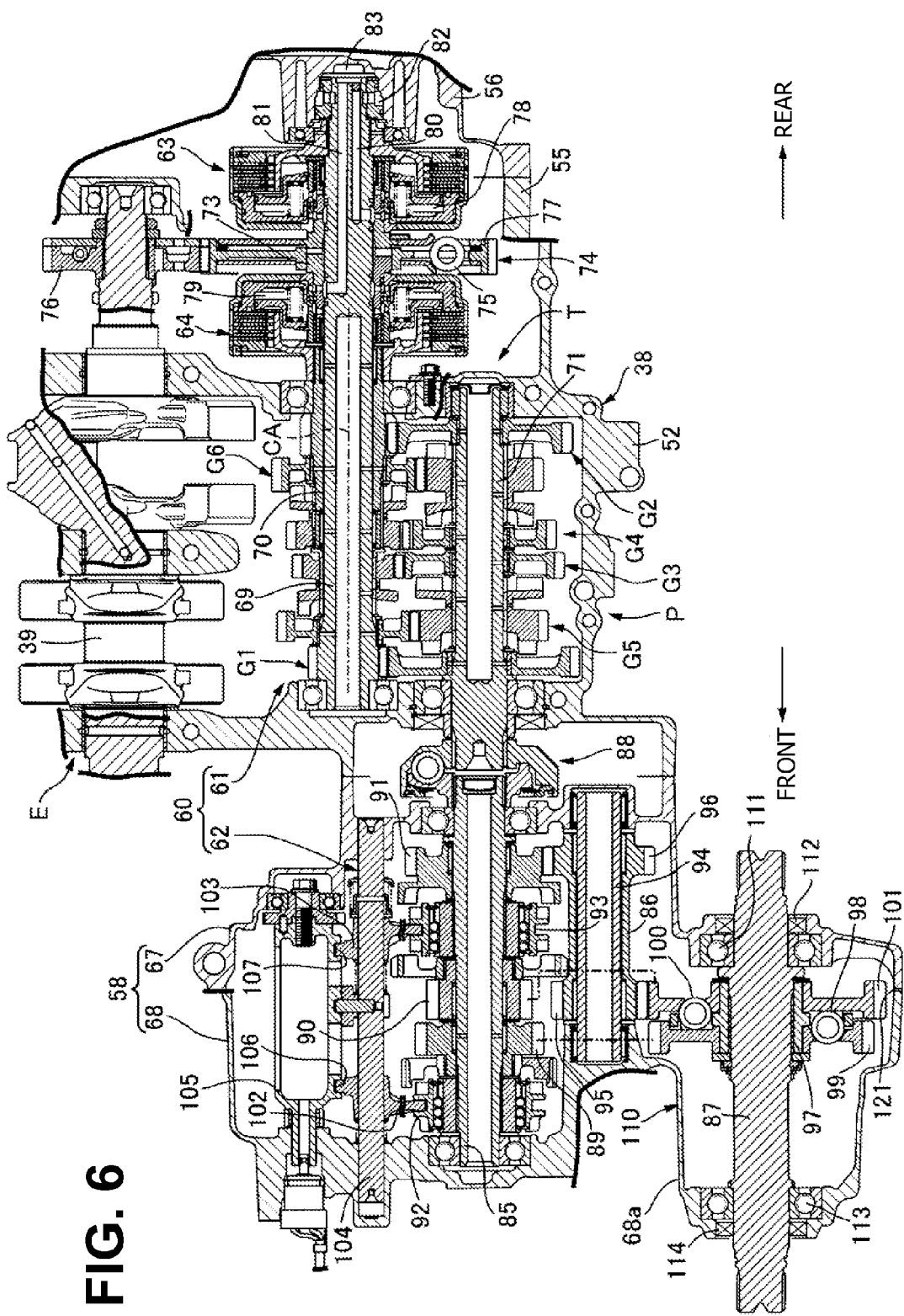
FIG. 6 is a developed sectional view of a power transmission system of the power unit.

Referring to FIG. 6 as well, a transmission system T constituting a power unit P together with the internal combustion engine E is provided between the crankshaft 39 of the internal combustion engine E and an intermediate portion of the motive power transmission system between the front wheels WF and the rear wheels WR (both of which are driving wheels). The transmission system T includes a transmission 60, and first and second hydraulic clutches 63 and 64 which are interposed between the transmission 60 and the crankshaft 39.

An output from the power unit P is transmitted to the left and right front wheels WF through a front-wheel propeller shaft 65 (see FIG. 3) extending in the longitudinal vehicle direction, and is transmitted to the left and right rear wheels WR through a rear-wheel propeller shaft 66 (see FIG. 3) extending in the longitudinal vehicle direction. The front-wheel propeller shaft 65 and the rear-wheel propeller shaft 66 are disposed to pass on the right side of the crankcase 52.

The transmission 60 includes a main transmission 61 accommodated in the crankcase 52, and a subtransmission 62 housed in the subtransmission case 58. The subtransmission case 58 includes a first case member 67 connected to a front surface of the crankcase 52, and a second case member 68 which is so disposed that the first case member 67 is located between itself and the crankcase 52.

The main transmission 61 includes: a first main shaft 69 and a second main shaft 70 which are input shafts for input from the crankshaft 39 to the transmission 60; a counter shaft 71; first, third and fifth speed gear trains G1, G3 and G5 provided between the first main shaft 69 and the counter shaft 71 so that they can be selectively established; and second, fourth and sixth speed gear trains G2, G4 and G6 provided between the second main shaft 70 and the counter shaft 71 so that they can be selectively established.

The first and second main shafts 69 and 70 are relatively rotatably supported on the crankcase 52 so that the second main shaft 70 coaxially surrounds a part of the first main shaft 69. The first and second main shafts 69 and 70 are disposed on the right side of the crankshaft 39, with their axis parallel to the crankshaft 39. In addition, the counter shaft 71 is rotatably supported on the crankcase 52, with its axis parallel to the first and second main shafts 69 and 70.

The selective establishment of the first to sixth speed gear trains G1 to G6 are changed over by operating a shift electric motor 72. As clearly shown in FIG. 4, the shift electric motor 72 is attached to a side projection 55a provided on the spacer plate 55 so as to project to the right side from the clutch cover 56.

A power transmission tubular shaft 73 coaxially surrounding the first main shaft 69 is supported on the first main shaft 69 at a position on the axially rear side of and adjacently to the second main shaft 70, in such a manner as to be rotatable but not movable in the axial direction in relation to the first main shaft 69. The first hydraulic clutch 63 is provided on the first main shaft 69 so as to be engaged and disengaged to effect and interrupt power transmission between the power transmission tubular shaft 73 and the first main shaft 69. The second hydraulic clutch 64 is provided on the power transmission tubular shaft 73 and the second main shaft 70 so as to be engaged and disengaged to effect and interrupt power transmission between the power transmission tubular shaft 73 and the second main shaft 70.

Rotational power from the crankshaft 39 is transmitted to the power transmission tubular shaft 73 through a primary speed reduction gear 74 and a damper spring 75. The primary speed reduction gear 74 includes a primary driving gear 76 rotated together with the crankshaft 39, and a primary driven gear 77 disposed coaxially with the first and second main shafts 69 and 70 so as to mesh with the primary driving gear 76. The primary driven gear 77 is connected to the power transmission tubular shaft 73 through the damper spring 75.

The first hydraulic clutch 63, having a first hydraulic chamber 78, is disposed on the outer side in the axial direction than the primary speed reduction gear 74. When no hydraulic pressure is exerted on the first hydraulic chamber 78, the first hydraulic clutch 63 is in a disengaged state (clutch off state) in which power transmission is interrupted. When a hydraulic pressure is exerted on the first hydraulic chamber 78, the first hydraulic clutch 63 is in an engaged state (clutch on state) in which rotational power transmitted from the crankshaft 39 through the primary speed reduction gear 74, the damper spring 75 and the power transmission tubular shaft 73 is transmitted to the first main shaft 69.

The second hydraulic clutch 64, having a second hydraulic chamber 79, is disposed on the inner side in the axial direction than the first hydraulic clutch 63 so that the primary speed reduction gear 74 is located between the second hydraulic clutch 64 and the first hydraulic clutch 63. When no hydraulic pressure is exerted on the second hydraulic chamber 79, the second hydraulic clutch 64 is in a disengaged state (clutch off state) in which power transmission is interrupted. When a hydraulic pressure is exerted on the second hydraulic chamber 79, the second hydraulic clutch 64 is in an engaged state (clutch on state) in which rotational power transmitted from the crankshaft 39 through the primary speed reduction gear 74, the damper spring 75 and the power transmission tubular shaft 73 is transmitted to the second main shaft 70.

The first main shaft 69 is provided therein with mutually parallel first and second axial oil passages 80 and 81 which are closed at inner ends thereof and extend in the axial direction. The first axial oil passage 80 communicates with the first hydraulic chamber 78, whereas the second axial oil passage 81 communicates with the second hydraulic chamber 79. In addition, a first oil passage 82 communicating with the first axial oil passage 80 and a second oil passage 83 communicating with the second axial oil passage 81 are formed in the clutch cover 56.

The subtransmission 62 includes a speed change driving shaft 85, an idle shaft 86 and a driving force output shaft 87. The speed change driving shaft 85 extends in the longitudinal vehicle direction, coaxially with the counter shaft 71 of the main transmission 61, and is rotatably supported on first and second case members 67 and 68 of the subtransmission case 58. Besides, a rear end portion of the speed change driving shaft 85 penetrates the first case member 67 in a rotatable manner, to protrude to the crankcase 52 side. A front end portion of the counter shaft 71 penetrating the crankcase 52 in a rotatable manner is coaxially coupled to the rear end portion of the speed change driving shaft 85 through a damper mechanism 88. In other words, rotational power of the counter shaft 71 is transmitted through the damper mechanism 88 to the speed change driving shaft 85.

In the subtransmission case 58, a high-speed driving gear 89, a low-speed driving gear 90 and a reverse driving gear 91 are supported on the speed change driving shaft 85 in a relatively rotatable manner, while being located in this order from the front side. Between the second case member 68 and the high-speed driving gear 89, a high-speed switching shifter 92 not rotatable relative to the speed change driving shaft 85 is slidably supported on the speed change driving shaft 85 so as to be switchable between a position for engagement with the high-speed driving gear 89 and a neutral position for disengagement from the high-speed driving gear 89. Between the low-speed driving gear 90 and the reverse driving gear 91, a forward-reverse switching shifter 93 not rotatable relative to the speed change driving shaft 85 is slidably supported on the speed change driving shaft 85 so as to be switched among a position for engagement with the low-speed driving gear 90, a position for engagement with the reverse driving gear 91, and a neutral position for engagement with neither of the low-speed driving gear 90 and the reverse driving gear 91.

The idle shaft 86 is formed in a hollow cylindrical shape surrounding a support shaft 94 which is rotatably supported on the first and second case members 67 and 68 of the subtransmission case 58. The idle shaft 86 is supported on the support shaft 94 in a relatively rotatable manner. Inside the subtransmission case 58, the idle shaft 86 is integrally provided at a front portion and a rear portion thereof with a small-diameter idle gear 95 and a large-diameter idle gear 96. The large-diameter idle gear 96 is meshed with the reverse driving gear 91.

Besides, a hollow cylindrical boss 97 is fixed to the driving force output shaft 87 in the manner of being disposed in a position corresponding to the small-diameter idle gear 95 and to the high-speed driving gear 89 and the low-speed driving gear 90 of the speed change driving shaft 85. A small-diameter driven gear 99 is connected to the boss 97 through a damper spring 98, and a large-diameter driven gear 101 is connected to the boss 97 through a damper spring 100. The high-speed driving gear 89 is meshed with the small-diameter driven gear 99, whereas the low-speed driving gear 90 and the small-diameter idle gear 95 are meshed with the large-diameter driven gear 101.

A first shift fork 102 rotatably embracing the high-speed switching shifter 92 and a second shift fork 103 rotatably embracing the forward-reverse switching shifter 93 are slidably supported on a shift fork shaft 104, which is supported on the first and second case members 67 and 68 of the subtransmission case 58 while having an axis parallel to the speed change driving shaft 85. In addition, a shift drum 105 having an axis parallel to the shift fork shaft 104 is turnably supported on the first and second case members 67 and 68. The first and second shift forks 102 and 103 are engaged with guide grooves 106 and 107 provided in an outer circumferential surface of the shift drum 105.

As the shift drum 105 is turned, the first and second shift forks 102 and 103 are moved along the shift fork shaft 104, whereby the high-speed driving gear 89, the low-speed driving gear 90 and the reverse driving gear 91 are selectively connected to the speed change driving shaft 85 in a relatively non-rotatable manner.

The subtransmission case 58 is formed with an output shaft support portion 110 projecting more to the right side than the crankcase 52. The driving force output shaft 87 offset in the axial direction in relation to the first and second main shafts 69 and 70 is rotatably supported on the output shaft support portion 110. A rear portion of the driving force output shaft 87 penetrates the output shaft support portion 110 in a rotatable manner, to protrude to the rear side, in a condition in which a ball bearing 111 and an oil seal 112 disposed on the outer side of the ball bearing 111 are interposed between the rear portion and the output shaft support portion 110 on the first case member 67 side. The rear-wheel propeller shaft 66, extending on the right side of the crankcase 52, is connected to a rear end portion of the output shaft support portion 110. In addition, a front portion of the driving force output shaft 87 penetrates the output shaft support portion 110 in a rotatable manner, to protrude to the front side, in a condition in which a ball bearing 113 and an oil seal 114 disposed on the outer side of the ball bearing 113 are interposed between the front portion and the output shaft support portion 110 on the second case member 68 side. The front-wheel propeller shaft 65 extending on the right side of the crankcase 52 is connected to a front end portion of the output shaft support portion 110.

Between the first case member 67 and the second case member 68, there is formed a breather chamber 115 having at least a part thereof disposed over a protruding part of a rear end portion of the driving force output shaft 87 which protrudes from the output shaft support portion 110.

The first case member 67 is integrally formed with a rearwardly protruding portion 116, at a part corresponding to an upper part of the output shaft support portion 110. The breather chamber 115 is formed between the protruding portion 116 and an upper portion of the second case member 68 at a position corresponding to the output shaft support portion 110. Besides, the second case member 68 of the subtransmission case 58 is integrally formed with a tubular portion 68a extending forward along the axial direction of the driving force output shaft 87 so as to cover the driving force output shaft 87 on a lateral side of the latter.

Figure 7:
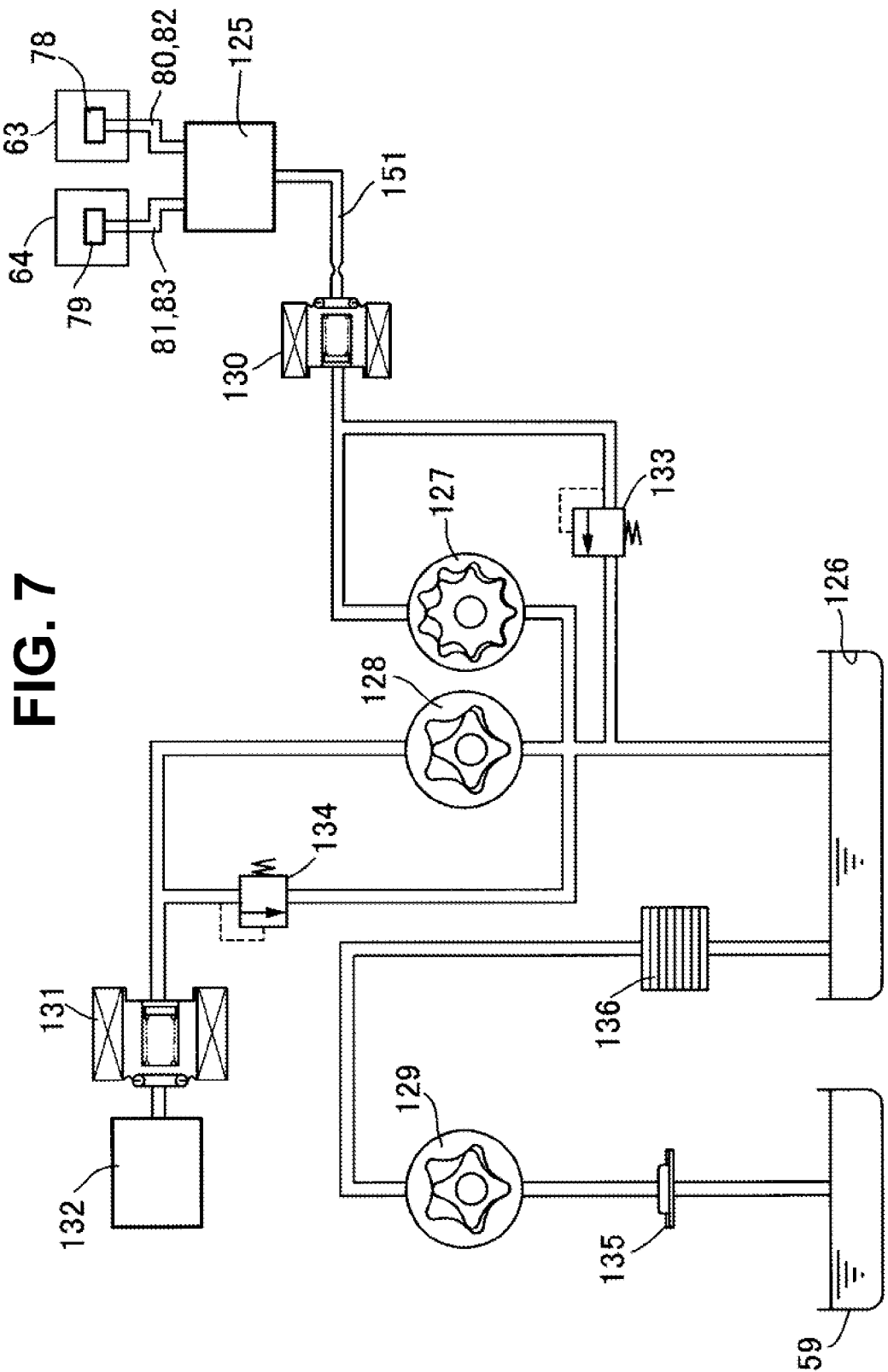
FIG. 7 is a diagram showing an oil distribution system.

In FIG. 7, the engagement and disengagement of the first and second hydraulic clutches 63 and 64 are switched by a clutch actuator 125, which is disposed at the clutch cover 56. Meanwhile, an oil sump 126 for temporary storage of oil is formed between the spacer plate 55 and the oil storage tank 57. An oil from a first oil feeding pump 127 for sucking up the oil from the oil sump 126 is supplied through a first oil filter 130 to the clutch actuator 125. The clutch actuator 125 operates so as to switch the action of and release of action of a hydraulic pressure on the first oil passage 82 and the first axial oil passage 80 communicating with the first hydraulic chamber 78 of the first hydraulic clutch 63, and the action of and release of action of a hydraulic pressure on the second oil passage 83 and the second axial oil passage 81 communicating with the second hydraulic chamber 79 of the second hydraulic clutch 64. By the operation of the clutch actuator 125, the engagement and disengagement of the first and second hydraulic clutches 63 and 64 are switched over. In addition, a surplus oil from the first oil feeding pump 127 is returned to the oil sump 126 via a first relief valve 133.

A second oil feeding pump 128 is connected to the oil sump 126, in common with the first oil feeding pump 127. The oil from the second oil feeding pump 128 is supplied through a second oil filter 131 to a plurality of lubricated portions 132 of the power unit P. A surplus oil from the second oil feeding pump 128 is returned to the oil sump 126 via a second relief valve 134.

The discharge capacity of the second oil feeding pump 128 is set to be greater than the discharge capacity of the first oil feeding pump 127. Therefore, the second oil filter 131 is greater than the first oil filter 130 in size.

In addition, the oil in the above-mentioned oil pan 59 is sucked up by a scavenger pump 129 via a strainer 135. The oil discharged from the scavenger pump 129 is supplied to the oil sump 126 via an oil cooler 136.

Paying attention to FIG. 4, the first oil feeding pump 127, the second oil feeding pump 128 and the scavenger pump 129 are coaxially disposed while aligned in parallel to the axis of the crankshaft 39 so as to be driven by rotational power transmitted from the crankshaft 39, cooperate with each other in constituting a pump unit 138, and are disposed at the above-mentioned spacer plate 55.

The oil storage tank 57, having a recess 140 for accommodating a part of the clutch cover 56, is disposed adjacently to the clutch cover 56. On the opposite side of the crankshaft 39 from the transmission 60, namely, on the opposite side from the clutch cover 56, the first and second oil filters 130 and 131 are mounted to an outside wall 57a of the oil storage tank 57 while being aligned in the vertical direction. In addition, the oil cooler 136 is mounted to an outer surface, facing toward the vehicle rear side, of an upper portion of the oil storage tank 57.

Figure 8:
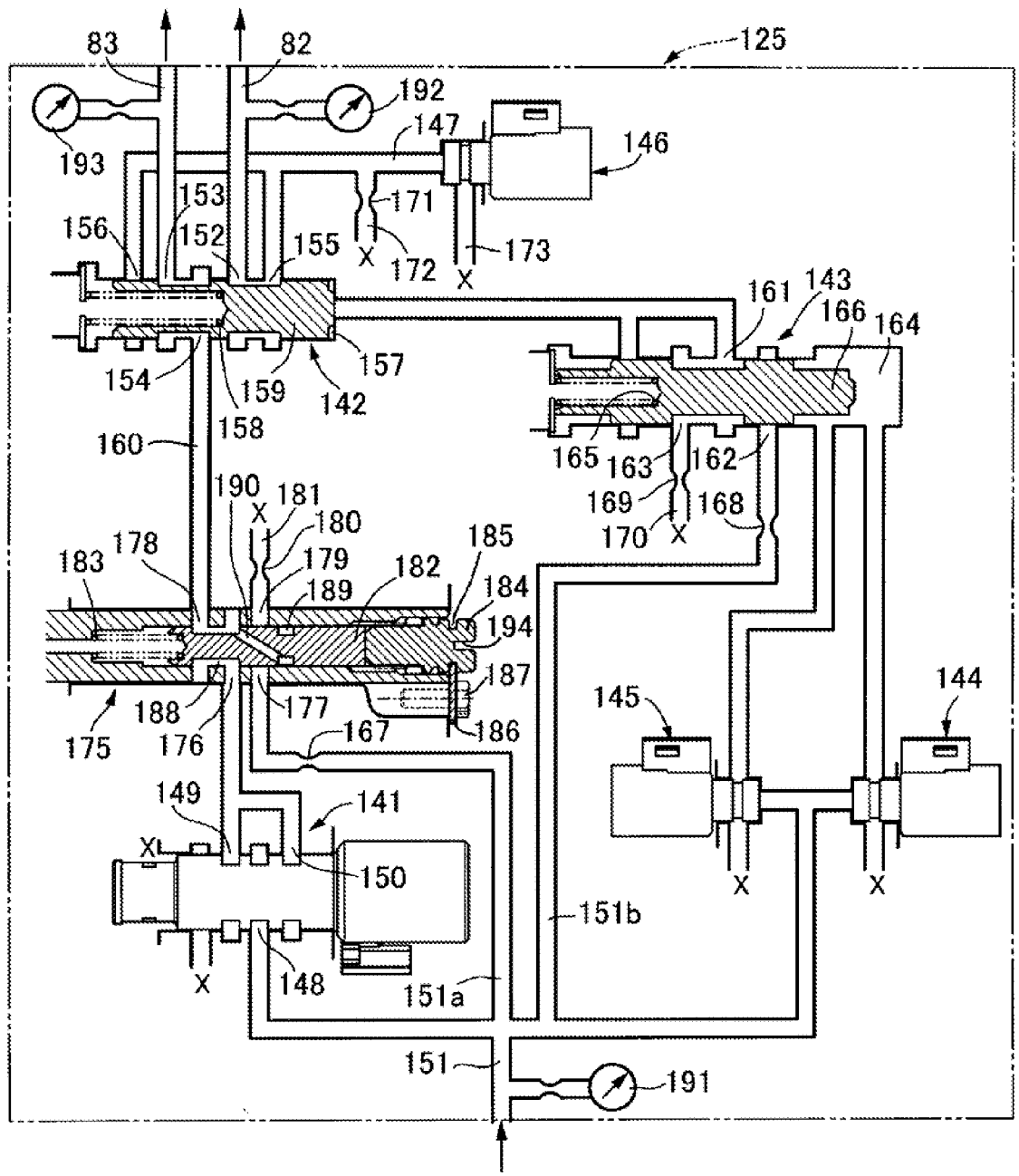
FIG. 8 is a diagram showing the configuration of a clutch actuator.

In FIG. 8, the clutch actuator 125 includes: a linear solenoid valve 141 as a hydraulic pressure control valve; an oil passage switching valve 142 for supplying the oil from the linear solenoid valve 141 alternatively and selectively into the first and second hydraulic chambers 78 and 79 of the first and second hydraulic clutches 63 and 64; a switching control valve 143 for switching control of the supply and discharge of the oil for a switching operation of the oil passage switching valve 142; a pair of shift solenoid valves 144 and 145 as valves for control of a switching operation of the switching control valve 143; and a discharge control solenoid valve 146 as a valve for opening/closing of a discharge oil passage 147 connected alternatively and selectively to the first and second hydraulic chambers 78 and 79 of the first and second hydraulic clutches 63 and 64.

The linear solenoid valve 141 includes an input port 148, an output port 149, and a feedback port 150 communicating with the output port 149. The linear solenoid valve 141 controls the oil pressure at the input port 148 (where the oil is inputted) to a pressure according to an electric current supplied, and outputs the oil at the controlled pressure via the output port 149. An oil supply passage 151 for guiding the oil supplied from the first oil feeding pump 127 through the first oil filter 130 is connected to the input port 148.

The oil passage switching valve 142 includes: a first output port 152 connected to the first oil passage 82 communicating with the first hydraulic chamber 78 of the first hydraulic clutch 63; a second output port 153 connected to the second oil passage 83 communicating with the second hydraulic chamber 79 of the second hydraulic clutch 64; an input port 154 communicating with a connection oil passage 160; a pair of first and second discharge ports 155 and 156 commonly connected to the discharge oil passage 147; and a spool valve body 159 so disposed that one end thereof is exposed to a pilot chamber 157 and a spring force of a return spring 158 acts on the other end thereof. The oil controlled in pressure by the linear solenoid valve 141, or the oil from a first branch oil supply passage 151*a* having an orifice 167, branched from the oil supply passage 151 and bypassing the linear solenoid valve 141, is guided into the connection oil passage 160.

The switching control valve 143 includes: an output port 161 connected to the pilot chamber 157 of the oil passage switching valve 142; an input port 162 connected to a second branch oil supply passage 151*b* which has an orifice 168 and is branched from the oil supply passage 151; a relief port 163; and a spool valve body 166 so disposed that one end thereof is exposed to a pilot chamber 164 and a spring force of a return spring 165 acts on the other end thereof. A relief oil passage 170 having an orifice 169 is connected to the relief port 163.

The pair of shift solenoid valves 144 and 145 are connected in parallel between the oil supply passage 151 and the pilot chamber 164 so as to switch between a state in which the oil supply passage 151 communicates with the pilot chamber 164 and a state in which the oil in the pilot chamber 164 is relieved to the exterior.

Besides, the discharge control solenoid valve 146 can switch between a state in which the working oil in the discharge oil passage 147 is relieved to the exterior via a relief oil passage 172 having an orifice 171 and a state in which the working oil in the discharge oil passage 147 is guided to a relief oil passage 173 in the manner of being relieved to the exterior without constriction.

In accordance with the clutch actuator 125 as above, the following is ensured. In a state in which the oil supply passage 151 is made to communicate with the pilot chamber 164 of the switching control valve 143 by the pair of shift solenoid valves 144 and 145, the spool valve body 166 of the switching control valve 143 is in such a position as to cause the input port 162 communicating with the second branch oil supply passage 151*b* to communicate with the output port 161, and as to cut off communication of the relief port 163 with the output port 161. In response to such an operation of the switching control valve 143, the spool valve body 159 of the oil passage switching valve 142 comes into such a position as to cut off communication of the first output port 152 with the first discharge port 155 although allowing the first output port 152 to communicate with the connection oil passage 160, and as to cut off communication of the second output port 153 with the connection oil passage 160 although allowing the second output port 153 to communicate with the second discharge port 156.

When the oil in the pilot chamber 164 of the switching control valve 143 is relieved to the exterior by the pair of shift solenoid valves 144 and 145, the spool valve body 166 of the switching control valve 143 comes into such a position as to cut off communication of the input port 162 (which communicates with the second branch oil supply passage 151*b*) with the output port 161, and as to cause the relief port 163 to communicate with the output port 161. In response to such an operation of the switching control valve 143, the spool valve body 159 of the oil passage switching valve 142 comes into such a position as to cut off communication of the second output port 153 with the second discharge port 156 although allowing the second output port 153 to communicate with the connection oil passage 160, and as to cut off communication of the first output port 152 with the connection oil passage 160 although allowing the first output port 152 to communicate with the first discharge port 155.

Between the linear solenoid valve 141 and the connection oil passage 160 communicating with the input port 154 of the oil passage switching valve 142, there is provided a manual switching valve 175. The manual switching valve 175 enables the oil from the first oil feeding pump 127 to be guided to the oil passage switching valve 142 side via the first branch oil supply passage 151*a* which bypasses the linear solenoid valve 141.

The manual switching valve 175 includes: a first input port 176 communicating with the output port 149 of the linear solenoid valve 141; a second input port 177 communicating with the first branch oil supply passage 151*a*; an output port 178 communicating with the connection oil passage 160; a relief port 179 connected to a relief passage 181 having an orifice 180; a spool valve body 182 movable between such a position as to cause the first input port 176 to communicate with the output port 178 and such a position as to cause the second input port 177 to communicate with the output port 178; a spring 183 biasing the spool valve body 182 toward such a position as to cause the first input port 176 to communicate with the output port 178; and an operating piston 184 making contact with the spool valve body 182 from the opposite side from the spring 183 while enabling the spool valve body 182 to be pushed to move, against the biasing force of the spring 183, toward such a position as to cause the second input port 177 to communicate with the output port 178.

The operating piston 184 is screw-engaged with the clutch cover 56 in an advanceable and retractable manner. The operating piston 184 is formed with an annular locking recess 185 at the outer periphery of an outer end portion thereof. An engaging plate 186 engageable with the locking recess 185 is fastened to the clutch cover 56 by a screw member 187. In a state in which the engaging plate 186 fastened to the clutch cover 56 is engaged with the locking recess 185, the spool valve body 182 is in a retracted position shown in FIG. 8. When the operating piston 184 is advanced in a screwing-in manner in a state in which the engaging plate 186 is unfastened from the clutch cover 56 and is disengaged from the locking recess 185, the spool valve body 182 is moved into an advanced position. The advanced position of the spool valve body 182 is maintained by engagement of the engaging plate 186, which is fastened to the clutch cover 56, with the outer end of the operating piston 184.

The spool valve body 182 is formed in the outer periphery thereof with an annular recess 188 which communicates with the output port 178 but is inhibited from communication with the second input port 177, irrespectively of the position of the spool valve body 182. The annular recess 188 is so formed that when the spool valve body 182 is in the retracted position, the second input port 177 is let communicate with the relief port 179, but when the spool valve body 182 is in the advanced position, the second input port 177 is inhibited from communication with the first input port 176. In addition, the spool valve body 182 is formed in the outer periphery thereof with an annular groove 189. The annular groove 189 is so formed that when the spool valve body 182 is in the advanced position, the annular groove 189 communicates with the second input port 177 and the relief port 179, but when the spool valve body 182 is in the retracted position, the annular groove 189 is inhibited from communication with the second input port 177 and the relief port 179. Furthermore, the spool valve body 182 is provided therein with an orifice passage 190 which interconnects the annular recess 188 and the annular groove 189.

The oil supply passage 151 is provided with a first oil pressure sensor 191 for detection of an oil supply pressure that is supplied from the first oil feeding pump 127 through the first oil filter 130. The first oil passage 82 is provided with a second oil pressure sensor 192 for detection of an oil pressure acting on the first hydraulic clutch 63. The second oil passage 83 is provided with a third oil pressure sensor 193 for detection of an oil pressure acting on the second hydraulic clutch 64.

Figure 9:
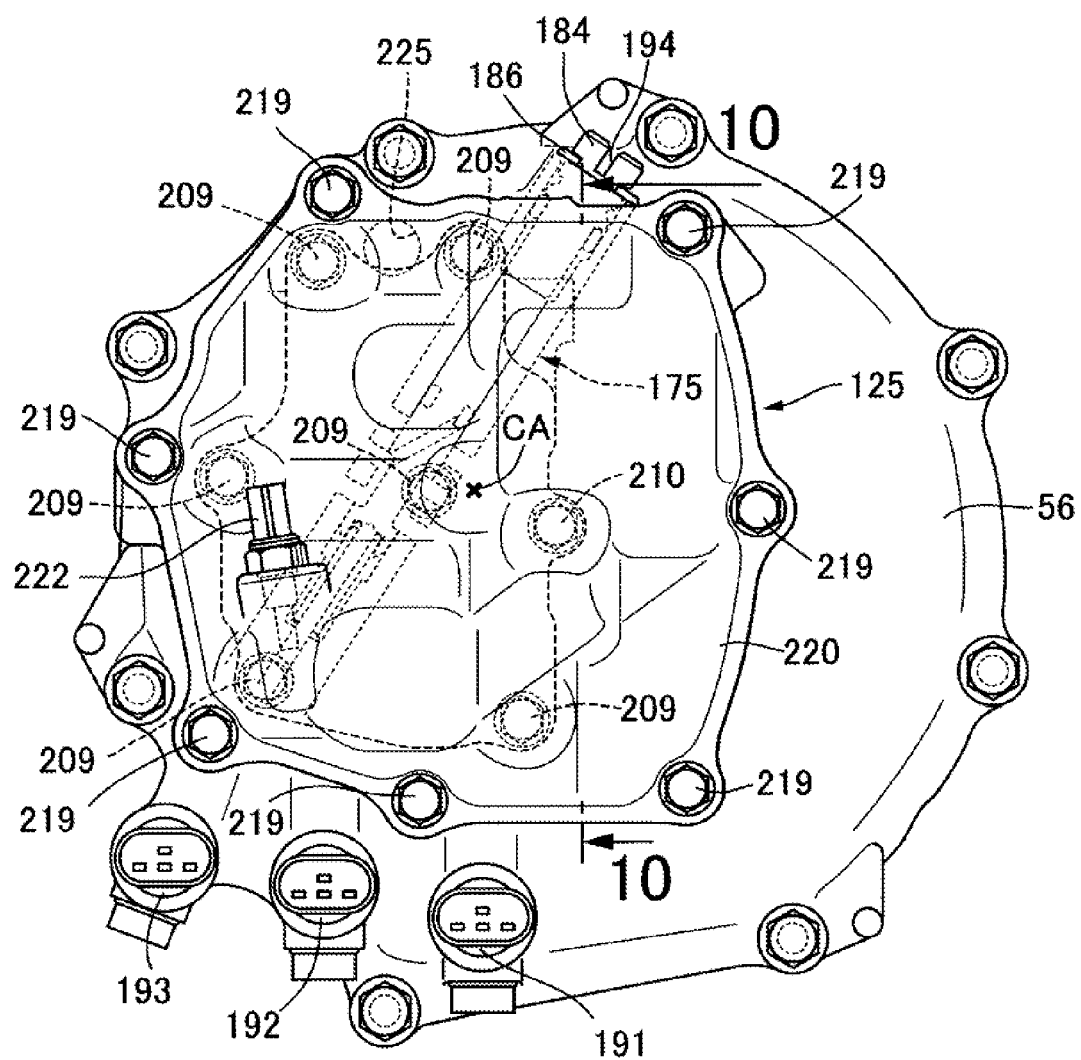
FIG. 9 is a view of a clutch cover and an actuator cover as viewed from the same direction as in FIG. 4.
Figure 10:
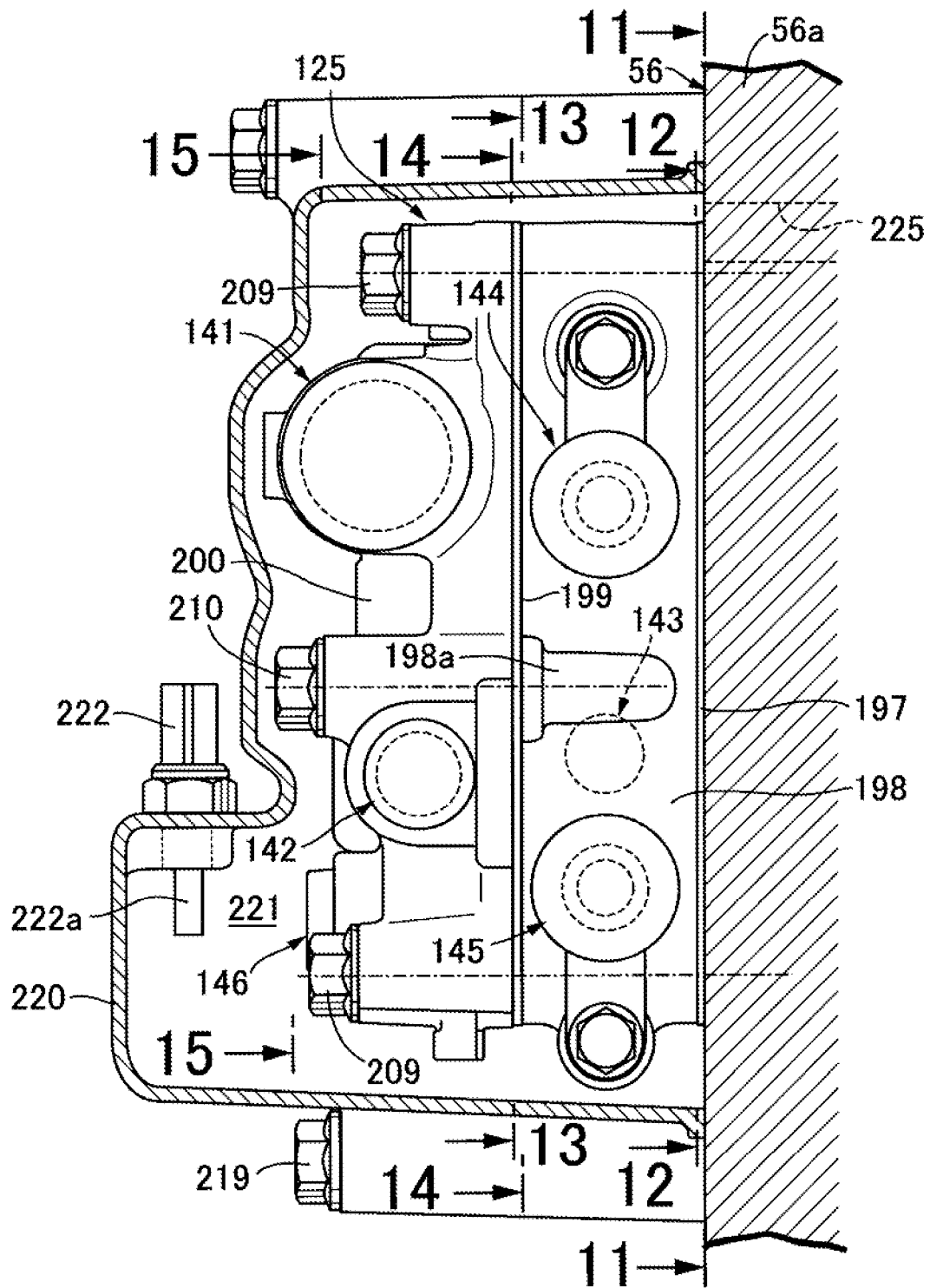
FIG. 10 is a sectional view taken along line 10-10 of FIG. 9.
Figure 11:
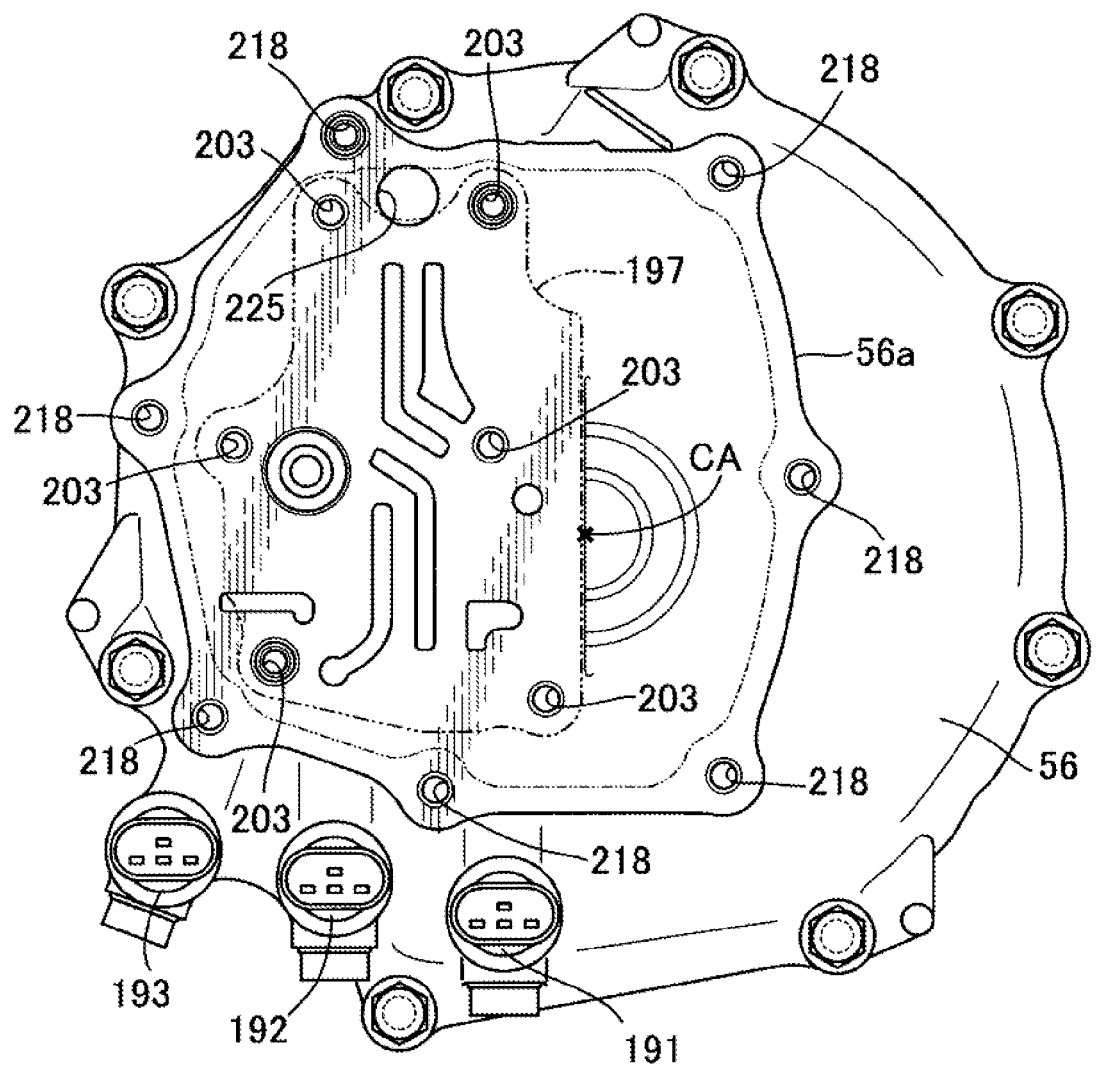
FIG. 11 is a view of the clutch cover as viewed in the arrow direction of line 11-11 of FIG. 10.

Referring to FIGS. 9 to 11 as well, an actuator mounting portion 56a onto which to mount the clutch actuator 125 is provided to integrally project from an outer surface of the clutch cover 56. The manual switching valve 175 is mounted to the actuator mounting portion 56a so as to extend in an up-down direction while inclining to be higher on the right side. In addition, the operating piston 184 which can be manually operated in emergency, such as upon a trouble with the clutch actuator 125, is screw-engaged with the actuator mounting portion 56a in an advanceable and retractable manner, with its outer end portion exposed to a right outer side of the actuator mounting portion 56a. The operating piston 184 is formed at its outer end with a tool locking recess 194 into which a tool can be engaged so as to rotate the operating piston 184 thereby.

In addition to the linear solenoid valve 141, the oil passage switching valve 142, the switching control valve 143, the shift solenoid valves 144 and 145 and the discharge control solenoid valve 146, the clutch actuator 125 is provided with a first partition plate 197, a first actuator body 198, a second partition plate 199 and a second actuator body 200 for supporting the valves 141 to 146 and for constituting oil passages extending between the valves 141 to 146. The first actuator body 198 is mounted to the actuator mounting portion 56a via the first partition plate 197. The second actuator body 200 overlapping with the first actuator body 198 from the opposite side from the clutch cover 56 is mounted to the first actuator body 198, with the second partition plate 199 interposed between the first actuator body 198 and the second actuator body 200.

Meanwhile, the actuator mounting portion 56a is provided at an outer surface of the clutch cover 56 while disposed in such a position that at least part thereof overlaps with the first and second hydraulic clutches 63 and 64 as viewed in the direction along the axis CA of the first and second main shafts 69 and 70 of the transmission 60. In this embodiment, the actuator mounting portion 56a is disposed at a position offset to the left side in the vehicle width direction, with reference to the axis CA of the first and second main shafts 69 and 70.

Figure 12:
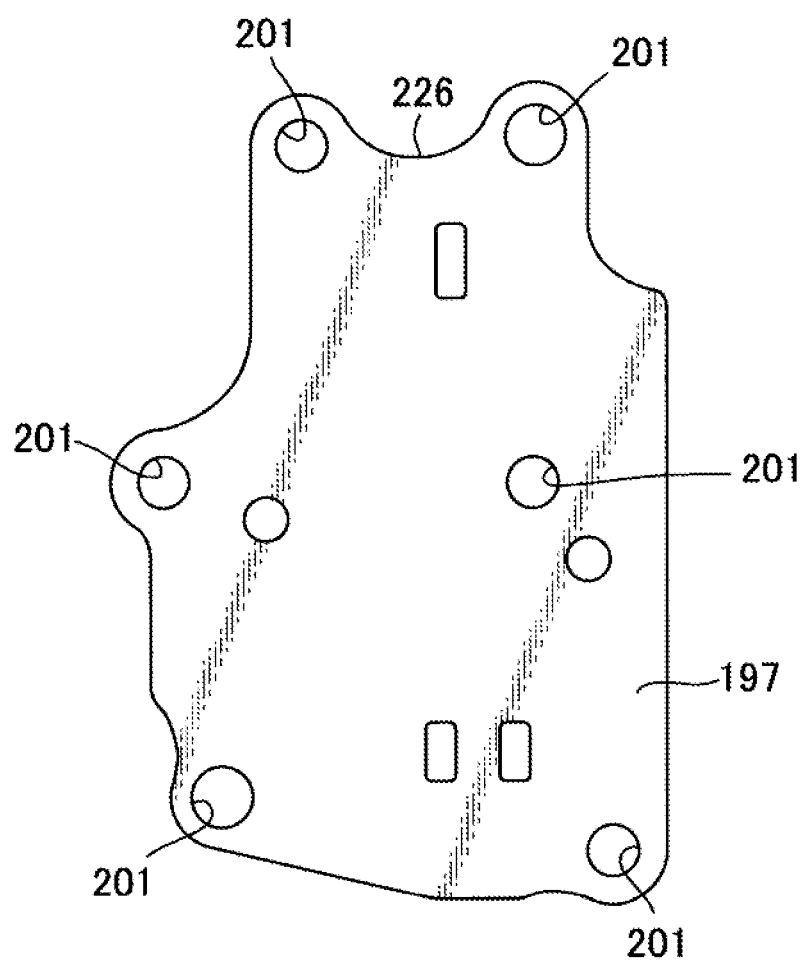
FIG. 12 is a view of a first partition plate as viewed in the arrow direction of line 12-12 of FIG. 10.
Figure 13:
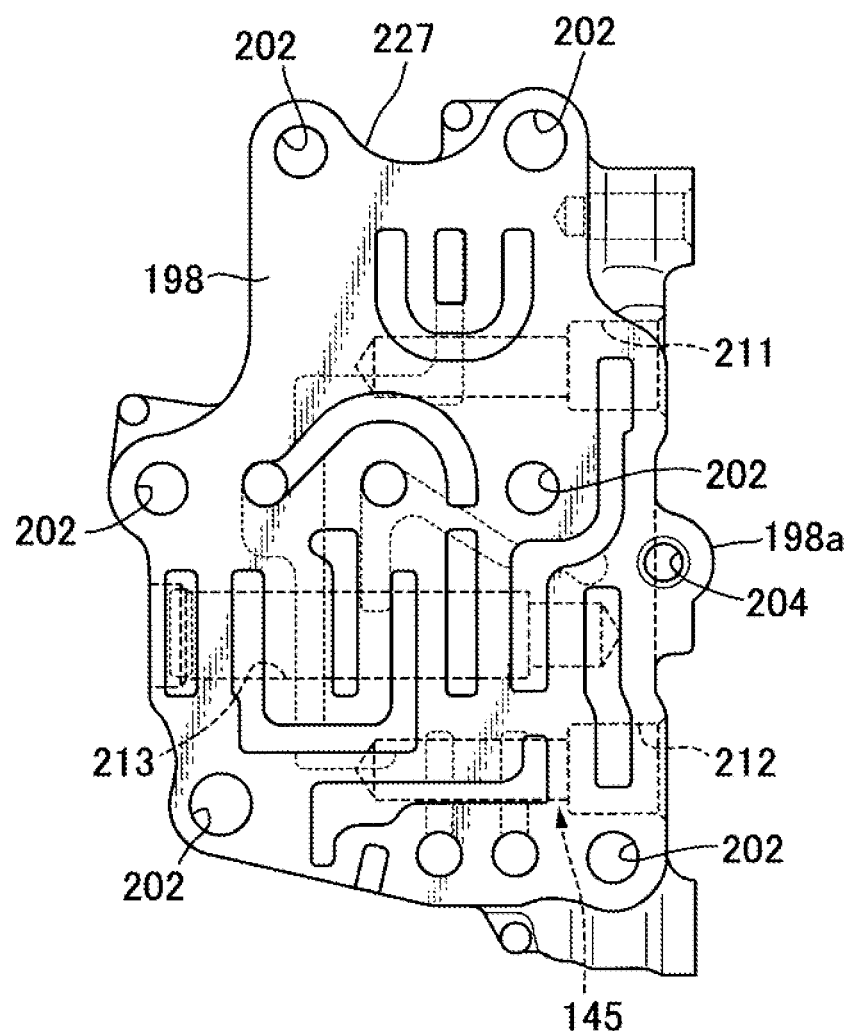
FIG. 13 is a view of a first actuator body as viewed in the arrow direction of line 13-13 of FIG. 10.

The first partition plate 197 and the first actuator body 198 are mounted to the actuator mounting portion 56a, at a position more offset to the left side in the vehicle width direction than the actuator mounting portion 56a, with reference to the axis CA of the first and second main shafts 69 and 70. As shown in FIG. 12, the first partition plate 197 is provided in its peripheral portion with six insertion holes 201 spaced apart along the circumferential direction. As shown in FIG. 13, the first actuator body 198 is provided in its peripheral portion with six insertion holes 202 spaced apart along the circumferential direction, correspondingly to the insertion holes 201. Further, as shown in FIG. 11, the actuator mounting portion 56a is provided with six bottomed screw holes 203 corresponding to the insertion holes 201 and 202.

In addition, at an intermediate portion in the vertical direction of a right side surface of the first actuator body 198, a boss portion 198a is integrally provided so as to protrude more to the right side than the first partition plate 197. The boss portion 198a is provided with a bottomed screw hole 204, which is opened to the second partition plate 199 side.

Figure 14:
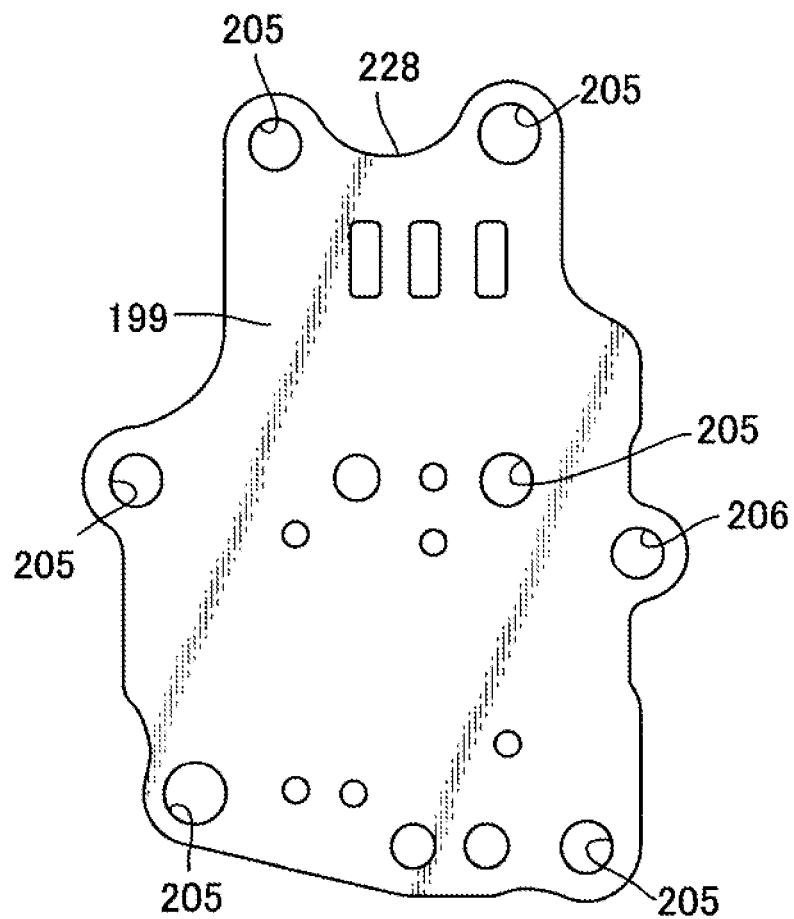
FIG. 14 is a view of a second partition plate as viewed in the arrow direction of line 14-14 of FIG. 10.

In FIG. 14, the second partition plate 199 is provided with six insertion holes 205 corresponding to the insertion holes 201 and 202 in the first partition plate 197 and the first actuator body 198, and is provided also with an insertion hole 206 corresponding to the screw hole 204 in the boss portion 198a of the first actuator body 198.

Figure 15:
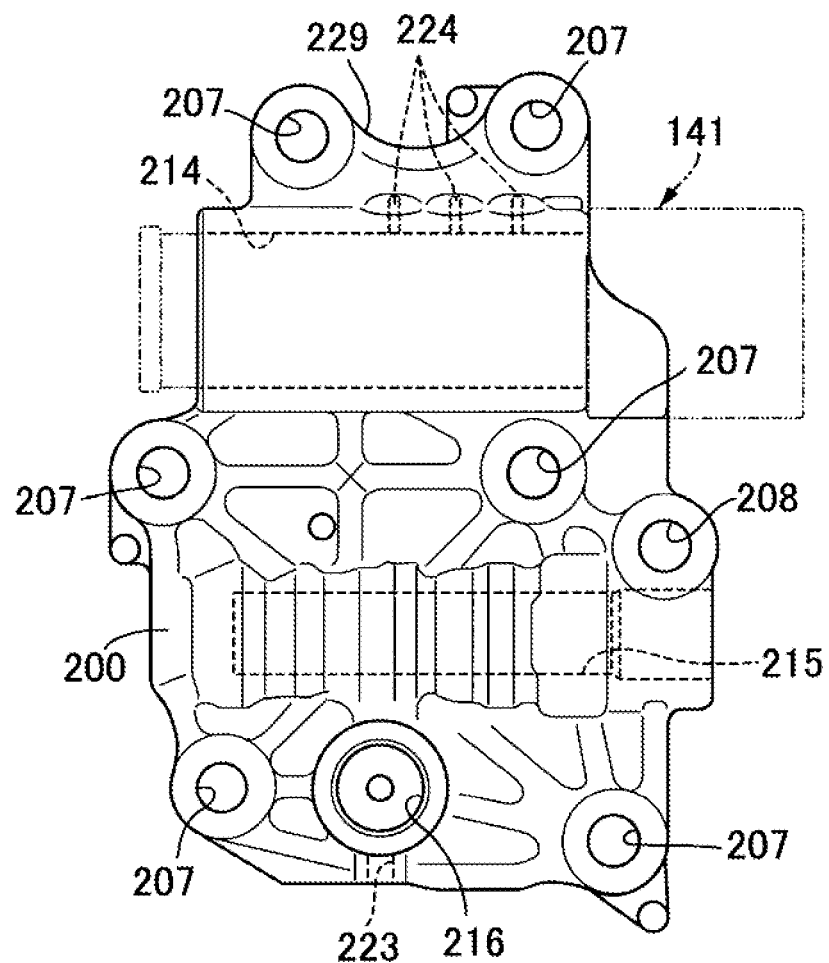
FIG. 15 is a view of a second actuator body as viewed in the arrow direction of line 15-15 of FIG. 10.

In FIG. 15, the second actuator body 200 is provided with six insertion holes 207 corresponding to the insertion holes 201, 202, and 205 in the first partition plate 197, the first actuator body 198 and the second partition plate 199, and is provided also with an insertion hole 208 corresponding to the insertion hole 206 in the second partition plate 199.

The first partition plate 197, the second partition plate 199 and the second actuator body 200 are mounted to the first actuator body 198 by a method wherein bolts 209 passed through the insertion holes 201, 202, 205, and 207 are screw-engaged into the screw holes 203 in the actuator mounting portion 56a of the clutch cover 56 and are fastened to the actuator mounting portion 56a, and wherein bolts 210 passed through the insertion holes 206 and 208 are screw-engaged into the screw holes 204 in the first actuator body 198 and are fastened to the latter.

The switching control valve 143 and the shift solenoid valves 144 and 145 as some of the linear solenoid valve 141, the oil passage switching valve 142, the switching control valve 143, the shift solenoid valves 144 and 145 and the discharge control solenoid valve 146, which are the plurality of valves constituting part of the clutch actuator 125, are disposed in the first actuator body 198.

The first actuator body 198 is provided therein with first and second valve mounting holes 211 and 212 which extend horizontally along a plane orthogonally intersecting the axis of the first and second hydraulic clutches 63 and 64, namely, the axis CA of the first and second main shafts 69 and 70 and opening in a right side surface of the first actuator body 198, in such a manner that the shift solenoid valves 144 and 145 are mounted in the valve mounting holes 211 and 212. In addition, the first actuator body 198 is provided therein with a third valve mounting hole 213 disposed in parallel to the valve mounting holes 211 and 212 and opening in a left side surface of the first actuator body 198, in such a manner that the switching control valve 143 is mounted in the third valve mounting hole 213.

Specifically, the switching control valve 143 and the shift solenoid valves 144 and 145 are disposed in the first actuator body 198 in a vertically aligned state, with their axes of operation set horizontal along a plane orthogonally intersecting the axis CA of the first and second main shafts 69 and 70.

Besides, the linear solenoid valve 141, the oil passage switching valve 142 and the discharge control solenoid valve 146, which are the valves remaining after excluding the switching control valve 143 and the shift solenoid valves 144 and 145 from the linear solenoid valve 141, the oil passage switching valve 142, the switching control valve 143, the shift solenoid valves 144 and 145 and the discharge control solenoid valve 146, are disposed in the second actuator body 200.

The second actuator body 200 is provided therein with a fourth valve mounting hole 214 and a fifth valve mounting hole 215 at positions spaced apart along the vertical direction. The fourth valve mounting hole 214 extends horizontally along a plane orthogonally intersecting the axis CA of the first and second main shafts 69 and 70, and has both ends thereof opening in both left and right side surfaces of the second actuator body 200. The fifth valve mounting hole 215 extends horizontally along a plane orthogonally intersecting the axis CA of the first and second main shafts 69 and 70, and is opening in a right side surface of the second actuator body 200. The linear solenoid valve 141 is mounted in the fourth valve mounting hole 214, and the oil passage switching valve 142 is mounted in the fifth valve mounting hole 215.

Besides, the second actuator body 200 is provided in its lower portion with a sixth valve mounting hole 216 located under the fifth valve mounting hole 215. The sixth valve mounting hole 216 extends in parallel to the axis CA of the first and second main shafts 69 and 70, and opens to the opposite side from the clutch cover 56. The discharge control solenoid valve 146 is mounted in the sixth valve mounting hole 216.

Meanwhile, part of the oil passages extending between the linear solenoid valve 141, the oil passage switching valve 142, the switching control valve 143, the shift solenoid valves 144 and 145 and the discharge control solenoid valve 146 are composed of pluralities of grooves, through-holes and bottomed holes provided in the first and second actuator bodies 198 and 200 and through-holes provided in the first and second partition plates 197 and 199.

The actuator mounting portion 56a of the clutch cover 56 is provided in its peripheral portion with a plurality of screw holes 218 spaced from one another. An actuator cover 220 for covering the clutch actuator 125 in a liquid-tight manner between itself and the actuator mounting portion 56a is mounted to the actuator mounting portion 56a by a plurality of bolts 219 screw-engaged into the screw holes 218. An oil chamber 221 is formed between the actuator mounting portion 56a of the clutch cover 56 and the actuator cover 220.

Under the first and second actuator bodies 198 and 200, specifically under the actuator cover 220 covering the first and second actuator bodies 198 and 200 in this embodiment, the second and third oil pressure sensors 192 and 193 for individual detection of oil pressures acting on the first and second hydraulic clutches 63 and 64 are mounted to a lower outer surface of the clutch cover 56, so as to be aligned with each other along the vehicle width direction. The first oil pressure sensor 191 for detection of the pressure of the oil supplied from the first oil feeding pump 127 is mounted to the lower outer surface of the clutch cover 56, at such a position that the second oil pressure sensor 192 is interposed between the first oil pressure sensor 191 and the third oil pressure sensor 193.

The temperature of the oil accumulated in the oil chamber 221 is detected by an oil temperature sensor 222. The oil temperature sensor 222 is mounted to a left-side lower portion of the actuator cover 220, in such a manner that its detecting portion 222a is disposed at a lower portion inside the oil chamber 221 so as to overlap with a left-side lower portion of the actuator body 200 as viewed in the direction along the axis of the first and second main shafts 69 and 70.

Moreover, in order to discharge into the oil chamber 221 the oil coming from the first and second hydraulic clutches 63 and 64, a hydraulic clutch relief oil passage 223 (see FIG. 15) communicating with the relief oil passages 172 and 173 is provided so that its exit opens in a lower portion of the second actuator body 200. In other words, the oil temperature sensor 222 is mounted to the actuator cover 220 so that its detecting portion 222a is disposed in the vicinity of the exit of the hydraulic clutch relief oil passage 223.

In addition, for example, three clutch actuator relief oil passages 224 (see FIG. 15) for discharging into the oil chamber 221 the oil discharged from the clutch actuator 125 are provided in an upper portion of the second actuator body 200.

Besides, an oil return passage 225 through which the oil in the oil chamber 221 is returned to the crankcase 52 side is provided at an upper portion of the actuator mounting portion 56a of the clutch cover 56, so as to be disposed above the clutch actuator 125. The first partition plate 197, the first actuator body 198, the second partition plate 199 and the second actuator body 200 are formed with recesses 226, 227, 228, and 229, respectively, disposed between two bolts 209 for mounting upper portions of these members 197 to 200 to the actuator mounting portion 56a so that the oil return passage 225 is exposed at the recesses 226 to 229.

Figure 16:
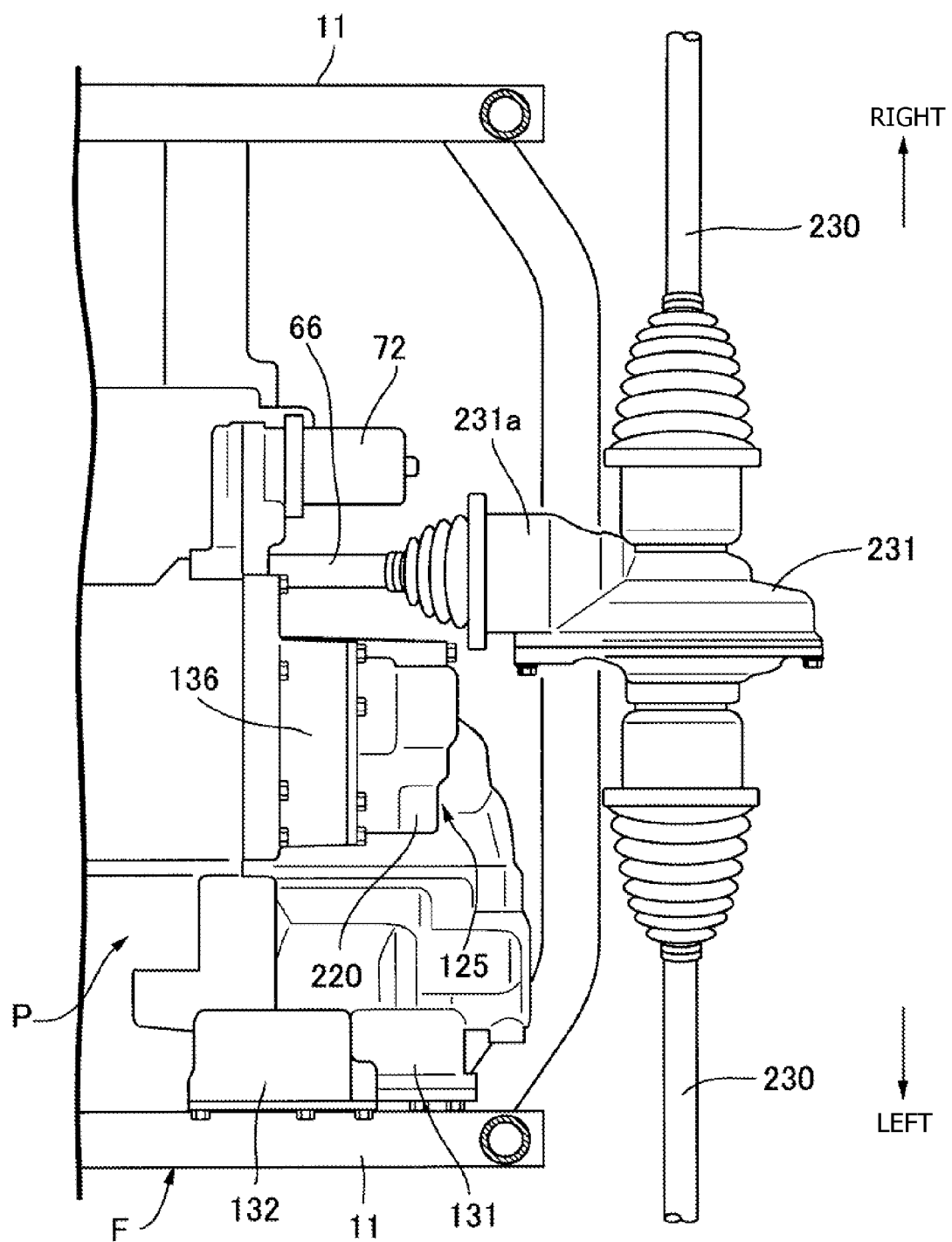
FIG. 16 is a plan view showing relative disposition of the power unit and a rear differential mechanism.

In FIG. 16, the crankshaft 39 of the internal combustion engine E in the power unit P is disposed with its axis oriented in the longitudinal vehicle direction so as to be orthogonal to the axis of a pair of driving shafts 230 connected with the pair of left and right rear wheels WR. In addition, the rear-wheel propeller shaft 66 for transmitting a driving force from the driving force output shaft 87 of the transmission 60 disposed on the right side in the left-right direction of the crankshaft 39 to the side of the left and right rear wheels WR is also extended in a direction parallel to the crankshaft 39, namely, in a direction orthogonal to the axis of the driving shafts 230. A rear end portion of the rear-wheel propeller shaft 66 is connected to a differential mechanism 231 provided between the pair of left and right driving shafts 230.

Moreover, the clutch actuator 125 and the actuator cover 220 covering the clutch actuator 125 are mounted to the clutch cover 56, which is disposed to face the differential mechanism 231 from the front side, at a position offset from the center axis of the first and second hydraulic clutches 63 and 64, namely, from the axis CA of the first and second main shafts 69 and 70. The clutch actuator 125 and the actuator cover 220 are disposed on the other side in the left-right direction, with reference to a shaft retaining portion 231a which constitutes part of the differential mechanism 231 and which retains an end portion, on the differential mechanism 231 side, of the propeller shaft 66. Specifically, the transmission 60 is disposed on the right side in the left-right direction, with respect to the crankshaft 39. On the other hand, the clutch actuator 125 and the actuator cover 220 are mounted to the clutch cover 56 at a position offset from the axis CA of the first and second main shafts 69 and 70, in such a manner as to be disposed on the left side in the left-right direction, with reference to the shaft retaining portion 231a.

Operation of this embodiment will now be described below. The first and second hydraulic clutches 63 and 64 which are engaged and disengaged to effect and interrupt power transmission between the crankshaft 39 and the first and second main shafts 69 and 70 are covered by the clutch cover 56 connected to the crankcase 52. The clutch actuator 125 for controlling the switching of the engagement and disengagement of the first and second hydraulic clutches 63 and 64 is mounted to the clutch cover 56. The switching control valve 143 and the shift solenoid valves 144 and 145, which are some valves of the plurality of valves 141, 142, 143, 144, 145 and 146 constituting part of the clutch actuator 125, are disposed in the first actuator body 198 mounted to an outer surface of the clutch cover 56 while disposed in such a position as to at least partly overlap with the first and second hydraulic clutches 63 and 64 when viewed in the direction along the axis CA of the first and second main shafts 69 and 70. The linear solenoid valve 141, the oil passage switching valve 142 and the discharge control solenoid valve 146, which are the remaining valves of the plurality of valves 141 to 146, are disposed in the second actuator body 200 mounted to the clutch cover 56 so as to overlap with the first actuator body 198 from the opposite side from the clutch cover 56. Therefore, it is possible to avoid an increase in the size of the clutch cover 56 in the radial direction of the first and second hydraulic clutches 63 and 64, and it is easy to form oil passages extending between the valves. In addition, the axes of operation of the switching control valve 143 and the shift solenoid valves 144 and 145 disposed in the first actuator body 198 are along a plane intersecting the axis CA of the first and second main shafts 69 and 70. Accordingly, it is possible to reduce the amount of extrusion of the clutch actuator 125 from the clutch cover 56 in the direction along the axis CA of the first and second main shafts 69 and 70, and to obviate an increase in the size of the vehicle on which the power unit P is mounted.

The switching control valve 143 and the shift solenoid valves 144 and 145 are disposed in the first actuator body 198 so as to be aligned in the vertical direction, with the axes of operation of the valves 143 to 145 set parallel to one another. Therefore, the first actuator body 198 can be made smaller in size while ensuring stable support of the switching control valve 143 and the shift solenoid valves 144 and 145.

The second and third oil pressure sensors 192 and 193 for individual detection of the oil pressures acting on the first and second hydraulic clutches 63 and 64 and the first oil pressure sensor 191 for detecting the pressure of the oil supplied from the first oil feeding pump 127 to the clutch actuator 125 side are provided on an outer surface of the clutch cover 56, under the first and second actuator bodies 198 and 200, specifically, under the actuator cover 220 covering the clutch actuator 125 including the first and second actuator bodies 198 and 200 in this embodiment. Therefore, the first to third oil pressure sensors 191 to 193 can be arranged compactly by utilizing a vacant space around the first and second actuator bodies 198 and 200. With detecting portions of the first to third oil pressure sensors 191 to 193 set at lower positions, upward air release properties can be enhanced. Consequently, it is possible to enhance the accuracy of oil pressure detection, and hence to enhance the accuracy of engagement-disengagement switching control of the first and second hydraulic clutches 63 and 64.

The switching control valve 143 is disposed between the pair of shift solenoid valves 144 and 145 so as to effect switching between an oil pressure exertion state and an oil pressure relief state of the first and second hydraulic clutches 63 and 64 by operating in response to operations of the shift solenoid valves 144 and 145. The pair of shift solenoid valves 144 and 145 and the switching control valve 143 are arranged on the first actuator body 198. Therefore, by switching between the oil pressure exertion state and the oil pressure relief state of the first and second hydraulic clutches 63 and 64 according to the operations of the pair of shift solenoid valves 144 and 145, it is possible to enhance the reliability while contriving a reduction in the size of the shift solenoid valves 144 and 145. The switching control valve 143 can be effectively disposed in the space generated between the pair of small-sized shift solenoid valves 144 and 145, whereby the clutch actuator 125 can be made smaller in size.

In addition, the crankcase 52 is disposed with the axis of the crankshaft 39 oriented in the direction orthogonal to the axis of the pair of driving shafts 230 connected to the pair of left and right rear wheels WR. The transmission 60 disposed on the right side, in the left-right direction, of the crankshaft 39 is accommodated in the crankcase 52. The clutch cover 56 is connected to the differential mechanism 231, provided between the pair of driving shafts 230, in the manner of facing the differential mechanism 231 from the front side in the longitudinal vehicle direction. The rear-wheel propeller shaft 66 disposed in parallel to the crankshaft 39 is connected to the differential mechanism 231 so as to transmit the driving force outputted from the transmission 60. The shaft retaining portion 231a constitutes part of the differential mechanism 231, and retains an end portion, on the differential mechanism 231 side, of the rear-wheel propeller shaft 66. The clutch actuator 125 is mounted to the clutch cover 56 at a position offset from the center axis CA of the first and second hydraulic clutches 63 and 64, so as to be disposed on the left side (in the left-right direction) of the shaft retaining portion 231a. With the power unit P and the differential mechanism 231 set close to each other, therefore, the power unit P can be arranged in a position nearer to the left and right rear wheels WR, whereby a vehicle enhanced in compactness can be realized.

The clutch actuator 125 is mounted to an outer surface of the clutch cover 56, and the actuator cover 220 for covering the clutch actuator 125 in a liquid-tight manner between itself and the clutch cover 56 is mounted to the clutch cover 56. Besides, the oil temperature sensor 222 for detecting the temperature of the oil accumulated in the oil chamber 221 formed between the clutch cover 56 and the actuator cover 220 is mounted to the actuator cover 220. Therefore, by closely arranging the clutch actuator 125 and the oil temperature sensor 222 in the vicinity of the first and second hydraulic clutches 63 and 64, it is possible to detect a temperature which is closer to the temperatures inside the first and second hydraulic clutches 63 and 64. Accordingly, the accuracy of control of the first and second hydraulic clutches 63 and 64 can be enhanced.

The hydraulic clutch relief oil passage 223 through which the oil from the first and second hydraulic clutches 63 and 64 is discharged into the oil chamber 221 is provided in the second actuator body 200 that constitutes part of the clutch actuator 125 and is mounted to the clutch cover 56. Therefore, the temperature of the oil discharged from the first and second hydraulic clutches 63 and 64 and flowing into the oil chamber 221 is detected by the oil temperature sensor 220. Consequently, it is possible to detect a temperature closer to the temperatures of the oil inside the first and second hydraulic clutches 63 and 64, and thereby to enhance more the accuracy of control of the first and second hydraulic clutches 63 and 64.

The clutch actuator relief oil passage 224 through which the oil discharged from the clutch actuator 125 is discharged into the oil chamber 221 is provided in the second actuator body 200. Therefore, the oil on the side of being supplied to the first and second hydraulic clutches 63 and 64 and the oil on the side of being discharged from the first and second hydraulic clutches 63 and 64 are mixed with each other in the oil chamber 221, and the temperature of the thus mixed oil is detected by the oil temperature sensor 222. Accordingly, it is possible to accurately detect the temperature of the oil in the first and second hydraulic clutches 63 and 64, and thereby to further enhance the accuracy of control of the first and second hydraulic clutches 63 and 64.

The exit of the hydraulic clutch relief oil passage 223 is provided in a lower portion of the second actuator body 200. The oil temperature sensor 222 is mounted to the actuator cover 220, with its detecting portion 222a disposed in the vicinity of the exit of the hydraulic clutch relief oil passage 223. Therefore, the temperature of the oil discharged from the first and second hydraulic clutches 63 and 64 immediately after starting can be detected swiftly. This ensures enhanced controllability of the first and second hydraulic clutches 63 and 64 at the time of warm-up.

The oil return passage 225 through which the oil in the oil chamber 221 is returned to the crankcase 52 side is provided in an upper portion of the clutch cover 56 so as to be disposed above the clutch actuator 125. Therefore, the clutch actuator 125 is located below the oil surface inside the oil chamber 221, and can therefore be lagged with the surrounding oil. Consequently, variations in the temperature of the clutch actuator 125 can be reduced, and the performance of control of the first and second hydraulic clutches 63 and 64 can be enhanced.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE SIGNS

39 . . . Crankshaft
52 . . . Crankcase
56 . . . Clutch cover
60 . . . Transmission
63 . . . First hydraulic clutch
64 . . . Second hydraulic clutch
69 . . . First main shaft as input shaft
70 . . . Second main shaft as input shaft
125 . . . Clutch actuator
200 . . . Second actuator body
220 . . . Actuator cover
221 . . . Oil chamber
222 . . . Oil temperature sensor
222a . . . Detecting portion
223 . . . Hydraulic clutch relief oil passage
224 . . . Clutch actuator relief oil passage
225 . . . Oil return passage
P . . . Power unit

What is claimed is:

1. A power unit comprising: a transmission adapted to transmit rotational power from a crankshaft, rotatably supported by a crankcase, to a drive axle with speed change, the transmission accommodated in the crankcase and having an input shaft rotatably supported on the crankcase, and a hydraulic clutch which is configured to be selectively engaged and disengaged to effect and interrupt transmission of power between the crankshaft and the input shaft, the hydraulic clutch disposed coaxially with the input shaft, wherein: a clutch cover covering the hydraulic clutch is connected to the crankcase, a clutch actuator, which is adapted to control switching of engaging and disengaging operations of the hydraulic clutch, and an actuator cover which covers the clutch actuator in a liquid-tight manner are mounted to an outer surface of the clutch cover; and an oil temperature sensor having a detecting portion for detecting a temperature of an oil accumulated in an oil chamber formed between the clutch cover and the actuator cover, is mounted to the actuator cover.

2. The power unit according to claim 1, wherein a hydraulic clutch relief oil passage, through which the oil from the hydraulic clutch is discharged into the oil chamber, is provided in an actuator body which constitutes part of the clutch actuator and which is mounted to the clutch cover.

3. The power unit according to claim 2, wherein a clutch actuator relief oil passage through which the oil discharged from the clutch actuator is discharged into the oil chamber is provided in the actuator body.

4. The power unit according to claim 3, wherein an exit of the hydraulic clutch relief oil passage is provided at a lower portion of the actuator body; and wherein the oil temperature sensor is mounted to the actuator cover, with the detecting portion of the oil temperature sensor disposed in a vicinity of the exit of the hydraulic clutch relief oil passage.

5. The power unit according to claim 4, wherein an oil return passage through which the oil in the oil chamber is returned to a crankcase side is provided in an upper portion of the clutch cover so as to be disposed above the clutch actuator.

6. The power unit according to claim 3, wherein an oil return passage through which the oil in the oil chamber is returned to a crankcase side is provided in an upper portion of the clutch cover so as to be disposed above the clutch actuator.

7. The power unit according to claim 2, wherein an exit of the hydraulic clutch relief oil passage is provided at a lower portion of the actuator body; and wherein the oil temperature sensor is mounted to the actuator cover, with the detecting portion of the oil temperature sensor disposed in a vicinity of the exit of the hydraulic clutch relief oil passage.

8. The power unit according to claim 7, wherein an oil return passage through which the oil in the oil chamber is returned to a crankcase side is provided in an upper portion of the clutch cover so as to be disposed above the clutch actuator.

9. The power unit according to claim 2, wherein an oil return passage through which the oil in the oil chamber is returned to a crankcase side is provided in an upper portion of the clutch cover so as to be disposed above the clutch actuator.

10. The power unit according to claim 1, wherein an oil return passage through which the oil in the oil chamber is returned to a crankcase side is provided in an upper portion of the clutch cover so as to be disposed above the clutch actuator.

11. A vehicle comprising a body frame and a power unit, operatively attached to the body frame and comprising: an engine having a crankshaft rotatably supported on a crankcase, a transmission adapted to transmit rotational power from the crankshaft to a drive axle with speed change, the transmission accommodated in the crankcase and having an input shaft rotatably supported on the crankcase, and a hydraulic clutch which is configured to be selectively engaged and disengaged to effect and interrupt transmission of power between the crankshaft and the input shaft, the hydraulic clutch disposed coaxially with the input shaft, wherein: a clutch cover covering the hydraulic clutch is connected to the crankcase, a clutch actuator, which is adapted to control switching of engaging and disengaging operations of the hydraulic clutch, and an actuator cover which covers the clutch actuator in a liquid-tight manner are mounted to an outer surface of the clutch cover; and an oil temperature sensor having a detecting portion for detecting a temperature of an oil accumulated in an oil chamber formed between the clutch cover and the actuator cover, is mounted to the actuator cover.

12. The vehicle according to claim 11, wherein a hydraulic clutch relief oil passage, through which the oil from the hydraulic clutch is discharged into the oil chamber, is provided in an actuator body which constitutes part of the clutch actuator and which is mounted to the clutch cover.

13. The vehicle according to claim 12, wherein a clutch actuator relief oil passage through which the oil discharged from the clutch actuator is discharged into the oil chamber is provided in the actuator body.

14. The vehicle according to claim 13, wherein an exit of the hydraulic clutch relief oil passage is provided at a lower portion of the actuator body; and wherein the oil temperature sensor is mounted to the actuator cover, with the detecting portion of the oil temperature sensor disposed in a vicinity of the exit of the hydraulic clutch relief oil passage.

15. The vehicle according to claim 14, wherein an oil return passage through which the oil in the oil chamber is returned to a crankcase side is provided in an upper portion of the clutch cover so as to be disposed above the clutch actuator.

16. The vehicle according to claim 13, wherein an oil return passage through which the oil in the oil chamber is returned to a crankcase side is provided in an upper portion of the clutch cover so as to be disposed above the clutch actuator.

17. The vehicle according to claim 12, wherein an exit of the hydraulic clutch relief oil passage is provided at a lower portion of the actuator body; and wherein the oil temperature sensor is mounted to the actuator cover, with the detecting portion of the oil temperature sensor disposed in a vicinity of the exit of the hydraulic clutch relief oil passage.

18. The vehicle according to claim 17, wherein an oil return passage through which the oil in the oil chamber is returned to a crankcase side is provided in an upper portion of the clutch cover so as to be disposed above the clutch actuator.

19. The vehicle according to claim 12, wherein an oil return passage through which the oil in the oil chamber is returned to a crankcase side is provided in an upper portion of the clutch cover so as to be disposed above the clutch actuator.

20. The vehicle according to claim 11, wherein an oil return passage through which the oil in the oil chamber is returned to a crankcase side is provided in an upper portion of the clutch cover so as to be disposed above the clutch actuator.

* * * * *